(12) United States Patent
Roche et al.

(10) Patent No.: US 10,284,670 B1
(45) Date of Patent: May 7, 2019

(54) NETWORK-CONTROLLED DEVICE MANAGEMENT SESSION

(71) Applicant: Amazon Technologies, Inc., Seattle, WA (US)

(72) Inventors: Kyle Michael Roche, Mercer Island, WA (US); David Craig Yanacek, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 15/176,097

(22) Filed: Jun. 7, 2016

(51) Int. Cl.
*G06F 15/16* (2006.01)
*H04L 29/08* (2006.01)
*H04L 29/06* (2006.01)

(52) U.S. Cl.
CPC ........ *H04L 67/2823* (2013.01); *H04L 67/125* (2013.01); *H04L 67/141* (2013.01); *H04L 67/147* (2013.01); *H04L 69/26* (2013.01)

(58) Field of Classification Search
CPC . H04L 67/2823; H04L 67/125; H04L 67/141; H04L 67/147; H04L 69/26
USPC ........................................................ 709/232
See application file for complete search history.

(56) References Cited

U.S. PATENT DOCUMENTS

| | | | | |
|---|---|---|---|---|
| 8,700,781 | B2 * | 4/2014 | Sawyer ................... | H04L 51/14 709/227 |
| 2002/0173984 | A1 * | 11/2002 | Robertson .............. | G06Q 10/10 709/220 |
| 2010/0261465 | A1 | 10/2010 | Rhoads et al. | |
| 2013/0024685 | A1 | 1/2013 | Kolavennu et al. | |
| 2014/0040975 | A1 * | 2/2014 | Raleigh ................. | H04W 12/12 726/1 |
| 2014/0282895 | A1 * | 9/2014 | Stuntebeck ............. | G06F 21/34 726/4 |
| 2014/0358297 | A1 | 12/2014 | Fadell et al. | |
| 2015/0319252 | A1 * | 11/2015 | Momchilov .......... | H04L 67/141 709/223 |
| 2016/0014154 | A1 * | 1/2016 | Huang .................... | H04L 63/20 726/1 |
| 2016/0040903 | A1 | 2/2016 | Emmons et al. | |
| 2016/0182402 | A1 * | 6/2016 | Carames ............... | H04L 47/808 709/225 |
| 2016/0241565 | A1 * | 8/2016 | Greene .......... | G06Q 10/063112 |
| 2017/0325120 | A1 * | 11/2017 | Szilagyi ................ | H04W 28/24 |

* cited by examiner

*Primary Examiner* — Kristie D Shingles
(74) *Attorney, Agent, or Firm* — Davis Wright Tremaine LLP

(57) ABSTRACT

A network-connected device service receives a request to establish a communications session with a network-connected device. In response to the request, the service transmits a second request to a container service to invoke a software container instance that can be used to establish the communications session with the network-connected device. The network-connected device service receives a notification from the container instance indicating whether the communications session has been established. If so, the service provides an indication to a controlling device that the session has been established. This enables the controlling device to submit commands executable by the network-connected device to the service, which provides the commands to the container instance and, hence, to the network-connected device.

20 Claims, 12 Drawing Sheets

NETWORK-CONTROLLED DEVICE MANAGEMENT SESSION

CROSS REFERENCE TO RELATED APPLICATIONS

This application incorporates by reference for all purposes the full disclosure of co-pending U.S. patent application Ser. No. 15/176,099, filed concurrently herewith, entitled "NETWORK-CONTROLLED DEVICE MANAGEMENT SESSION OVER MOBILE COMMUNICATIONS NETWORKS."

BACKGROUND

As network-connected devices become more prolific, the need to establish and maintain connectivity with these network-connected devices becomes paramount. These network-connected devices may rely on varying standards for communication, which enable operators of these network-connected devices to transmit commands to these network-connected devices and receive messages from these network-connected devices. However, some standards of communication may rely on proprietary protocols or other protocols that inhibit access to certain network-connected devices over more popular communications networks, such as the Internet. For such network-connected devices, users may be required to pre-batch a set of commands that are to be executed on a network-connected device. The user of the network-connected device may have to wait for successful execution of the provided set of commands to obtain the results or to provide additional commands to the network-connected device. Thus, a user may be limited to relying on the proprietary protocol utilized by the network-connected device to interact with the network-connected device.

BRIEF DESCRIPTION OF THE DRAWINGS

Various techniques will be described with reference to the drawings, in which.

DETAILED DESCRIPTION

Figure 1:
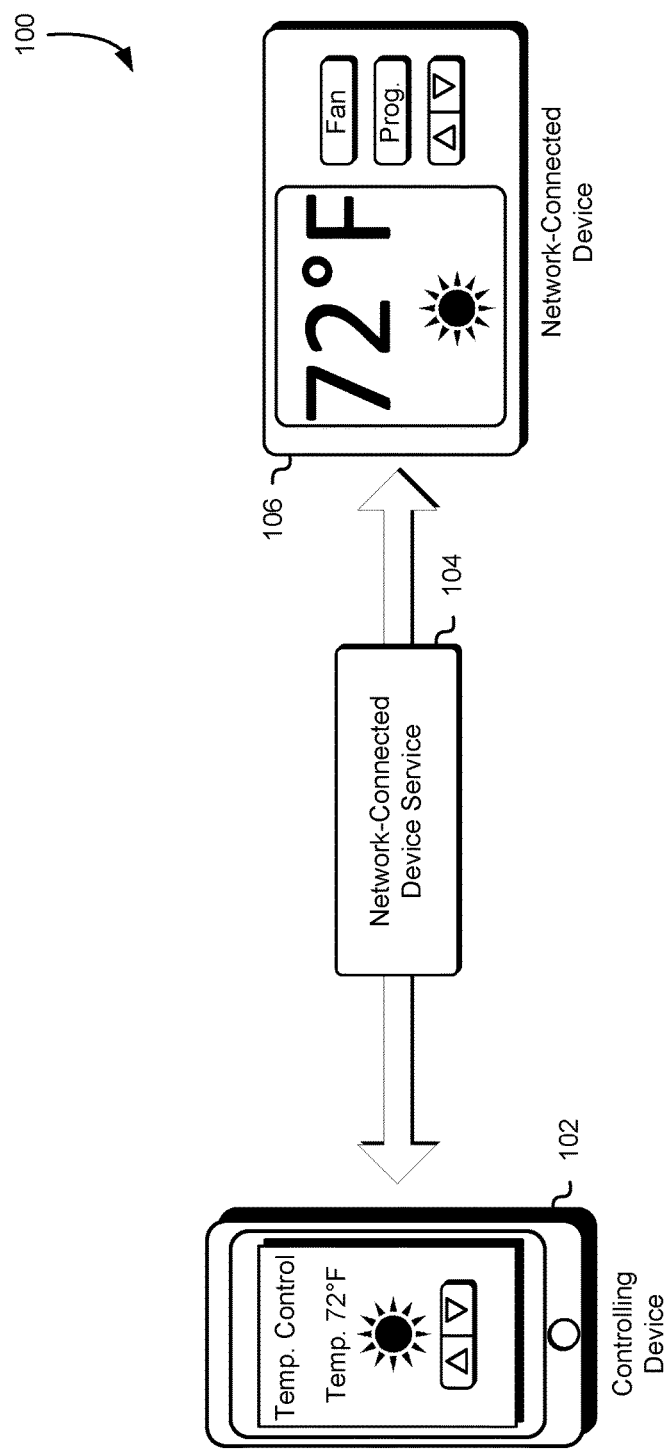
FIG. 1 shows an illustrative example of an environment in which various embodiments can be implement.

This disclosure relates to the use of container instances to establish a communications channel between a network-connected device service and a network-connected device to enable user interactions with the network-connected device over a communications network, such as the Internet. In one example, an operator of a network-connected device (e.g., Internet of Things (IoT) device, etc.) submits a request to a network-connected device service to initiate a communications session with the network-connected device. The operator may utilize a controlling device (e.g., smartphone, laptop, tablet computer, other computing devices, etc.) to submit the request to the network-connected device service and to interact with the network-connected device if the communications sessions is successfully established by the network-connected device service. In response to the request from the operator, the network-connected device service may evaluate any rules configured by the operator that may be used to determine what operations are to be performed to fulfill the request. For example, the rules may specify proprietary protocol information that may be used to establish the communications session with a network-connected device that only transmits and receives communications using a proprietary protocol.

In an example, the network-connected device service transmits, based on the rules configured by the operator, a request to a container service to invoke a software container instance that can be used to establish the communications channel with the network-connected device. The request may specify the amount of memory and processing capacity allocated to the software container instance, as well as configuration information for one or more applications that may be executed through the software container instance. The container service may utilize the information specified in the request to launch the software container instance. In some examples, the software container instance may query a database of the network-connected device service to obtain information regarding the network-connected device to which it is to establish a communications channel. This information may specify any proprietary protocols used by the network-connected device and other configuration information that may be required to establish the communications channel with the network-connected device. Using the information obtained from the network-connected device service regarding the network-connected device, the software container instance may attempt to establish a communications channel with the network-connected device. If a connection is successfully established between the software container instance and the network-connected device, the software container instance may transmit a notification to the network-connected device service indicating that a connection has been established.

The network-connected device service may notify the operator that a connection has been established between the software container instance and the network-connected device. This may enable the operator to publish various commands for the network-connected device to a message topic established by the network-connected device service and accessible by the software container instance. The software container instance may query this particular message topic to determine whether the operator has provided any new commands for the network-connected device. If the message topic specifies one or more commands for the network-connected device, the software container instance may transmit these new commands to the network-connected device over the communications channel established between the software container instance and the device. The software container instance may monitor the network-connected device to determine whether the commands were executed successfully. For instance, the network-connected device may transmit a message to the software container instance indicating the status of execution of the provided commands. Based on the successful or unsuccessful execution of the commands by the network-connected device, the software container instance may add a message to the message topic to indicate whether the commands provided by the operator were executed successfully.

In this manner, an operator of a network-connected device may use the network-connected device service to establish a communications channel to the network-connected device and receive information from the network-connected device as the commands are being executed. In addition, the techniques described and suggested in this disclosure enable additional technical advantages. For instance, because the operator of the network-connected device may provide commands to the network-connected device service destined for the network-connected device over a communications network, such as the Internet, the operator may no longer be required to pre-batch commands that are to be executed on the network-connected device. Further, because commands are provided through a message topic that is used by the software container instance to obtain and transmit the commands to the network-connected device, an operator may share access to the network-connected device to other devices and operators.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implement. In the environment 100, a user of a controlling device 102 may utilize the controlling device 102 to transmit a request to a network-connected device service 104 to initiate a communications session with a network-connected device 106. The controlling device 102 may be a smartphone, tablet computer, laptop computer, smartwatch, or any other computing device that may include one or more peripheral devices and other devices installed therein. The user of the controlling device 102 may be an operator of the network-connected device 106 that may utilize a management application installed on the controlling device 102 to interact with the network-connected device 106 and with the network-connected device service 104.

The network-connected device 106 may be an electronic device that includes a mechanism for communication (e.g. WiFi, Bluetooth®, Near Field Communication (NFC), etc.), a mechanism for determining its physical location, and a mechanism for processing and executing commands received from a controlling device 102 or from the software container instance invoked by the network-connected device service 104, as will be described in greater detail below. In some embodiments, the network-connected device 106 is a headless device that has no external display screen, buttons, or other types of controls for external control of the network-connected device 106. The network-connected device 106 may provide state information to the network-connected device service 104 over time. For instance, the network-connected device 106 may transmit, using HTTP, MQTT, or other communications protocols, state information for the device 106 to the network-connected device service 104. The network-connected device service 104 may store this state information in one or more device records. The one or more device records may function as state machines for the network-connected device 106, whereby the device records may store a data structure used to track the state of the network-connected device 106 as the network-connected device 106 transmits state information to the network-connected device service 104 and as a controlling device transmits state information to the network-connected device service 104 destined for the network-connected device 106.

In an embodiment, the user of the controlling device 102 transmits one or more configuration rules to the network-connected device service 104, which can be utilized to determine the configuration of a software container instance that is to be invoked to establish a communications session between the software container instance and the network-connected device 106. For instance, the configuration rules may specify a proprietary protocol or other communications protocol utilized by the network-connected device 106 to transmit and receive messages. Additionally, the configuration rules may specify the amount of memory and processing capacity allocated to the software container instance, as well as configuration information for one or more applications that may be executed through the software container instance. In some embodiments, the one or more rules specify a location of a registry that may include information usable to identify the proprietary protocol or other communications protocol utilized by the network-connected device 106. The registry may further include other configuration information for the software container instance that is to be invoked to establish the session with the network-connected device 106.

If the user of controlling device 102 desires to create a communications session with the network-connected device 106 through use of the network-connected device servicer 104, the user may transmit a request to the network-connected device service to initiate a communications session with the network-connected device 106. For instance, the user may utilize the controlling device 102 to transmit one or more application programming interface (API) calls to the network-connected device service 104, such as a "StartSession" API call, to initiate the communications session. In response to the one or more API calls from the controlling device 102, the network-connected device service 104 may evaluate the one or more configuration rules provided by the user of the controlling device 102. The one or more configuration rules may specify the actions to be performed in response to receiving the one or more API calls from the controlling device 102. In some embodiments, a user may be required to provide a set of credentials to the network-connected device service 104 for authentication of the user and to determine whether the user is authorized to initiate the communications session.

In response to the one or more API calls from the controlling device 102, the network-connected device service 104 may invoke a software container instance that may be used to establish the communications session with the network-connected device 106. Based at least in part on the configuration rules provided by the controlling device 102, the network-connected device service 104 may transmit a request to a container service to provision one or more container instances that may be used to establish the communications session with the network-connected device 106. The request to the container service may be in the form of one or more API calls to the container service, such as an "InvokeContainer" API call, that may specify the desired configuration for the one or more software container instances. The container service, in response to the request, may provision and launch the desired one or more software container instances for the network-connected device service 104.

The software container instance, based at least in part on its configuration by the container service and as specified by the network-connected device service 104, may query a network-connected device database provided by the network-connected device service 104 to obtain information about the network-connected device 106 that may be used to locate the network-connected device 106 and to establish a connection with the network-connected device 106. For instance, the information about the network-connected device 106 may specify an Internet Protocol (IP) address or other communications protocol address for a network gateway device of the network-connected device 106, the port number that is to be used to access the network gateway device or the network-connected device 106, the proprietary protocol utilized by the network-connected device 106, and the like. In some embodiments, the information may be included in the configuration of the software container instance such that the software container instance may not be required to query the network-connected device database to obtain the information about the network-connected device 106. The software container instance may utilize the information about the network-connected device 106 to establish a communications session with the network-connected device 106.

In an embodiment, the software container instance transmits a notification to the network-connected device service 104 indicating that a connection to the network-connected device 106 has been successfully established. In response to the notification, the network-connected device service 104 may transmit a message to the controlling device 102 indicating that a connection has been established with the network-connected device 106. In some instances, the network-connected device service 104 may add the message to a message topic designated for the network-connected device 106. The user of the controlling device 102 and the software container instance may be subscribed to this message topic. Thus, the user of the controlling device 102 may receive an indication from the network-connected device service 104 that a new message has been added to the message topic. This may enable the user of the controlling device 102 to access the message topic and obtain the message from the software container instance.

If the communications session between the software container instance and the network-connected device 106 is successfully established, the user of the controlling device 102 may enable communications between the network-connected device 106 and the controlling device 102. For instance, the controlling device 102 may transmit, to the network-connected device service 104, one or more commands that are to be executed by the network-connected device 106. In some embodiments, the network-connected device service 104 adds these one or more commands provided by the user of the controlling device 102 to the message topic designated for the network-connected device 106. The software container instance connected to the network-connected device 106 may access the message topic and obtain the one or more commands that are to be executed by the network-connected device 106. The software container instance may transmit the one or more commands obtained from the message topic to the network-connected device 106 over the established communications channel. It should be noted that while message topics are used throughout the present disclosure for the purpose of illustration, alternative methods may be used to provide commands from the controlling device 102 to the software container instance. For instance, the network-connected device service 104 may transmit the commands from the controlling device 102 to the software container instance instead of publishing the commands to the message topic.

In some embodiments, if the communications session between the software container instance and the network-connected device 106 is successfully established, the network-connected device 106 can also transmit one or more messages to the message topic that the controlling device 102 is subscribed to. For instance, if the controlling device 102 submits a command to the network-connected device 106, through the software container instance, to provide a stream of data for the network-connected device 106 over time, the network-connected device 106 may transmit this stream of data to the software container instance, which may add this data to the message topic. Thus, the controlling device 102 may access the message topic that it is subscribed to in order to obtain data transmitted by the network-connected device 106 over the communications session.

The network-connected device 106 may transmit status information to the software container instance as the commands from the controlling device 102 are executed. In response to receiving this status information, the software container instance may transmit one or more messages to the network-connected device service 104. This may cause the network-connected device service 104 to add the one or more messages to the message topic designated for the network-connected device 106. The user of the controlling device 102 may access the message topic through the network-connected device service 104 to obtain the one or more messages from the software container instance. Thus, the user of the controlling device 102 may utilize the software container instance as a proxy to access and interact with the network-connected device 106.

Figure 2:
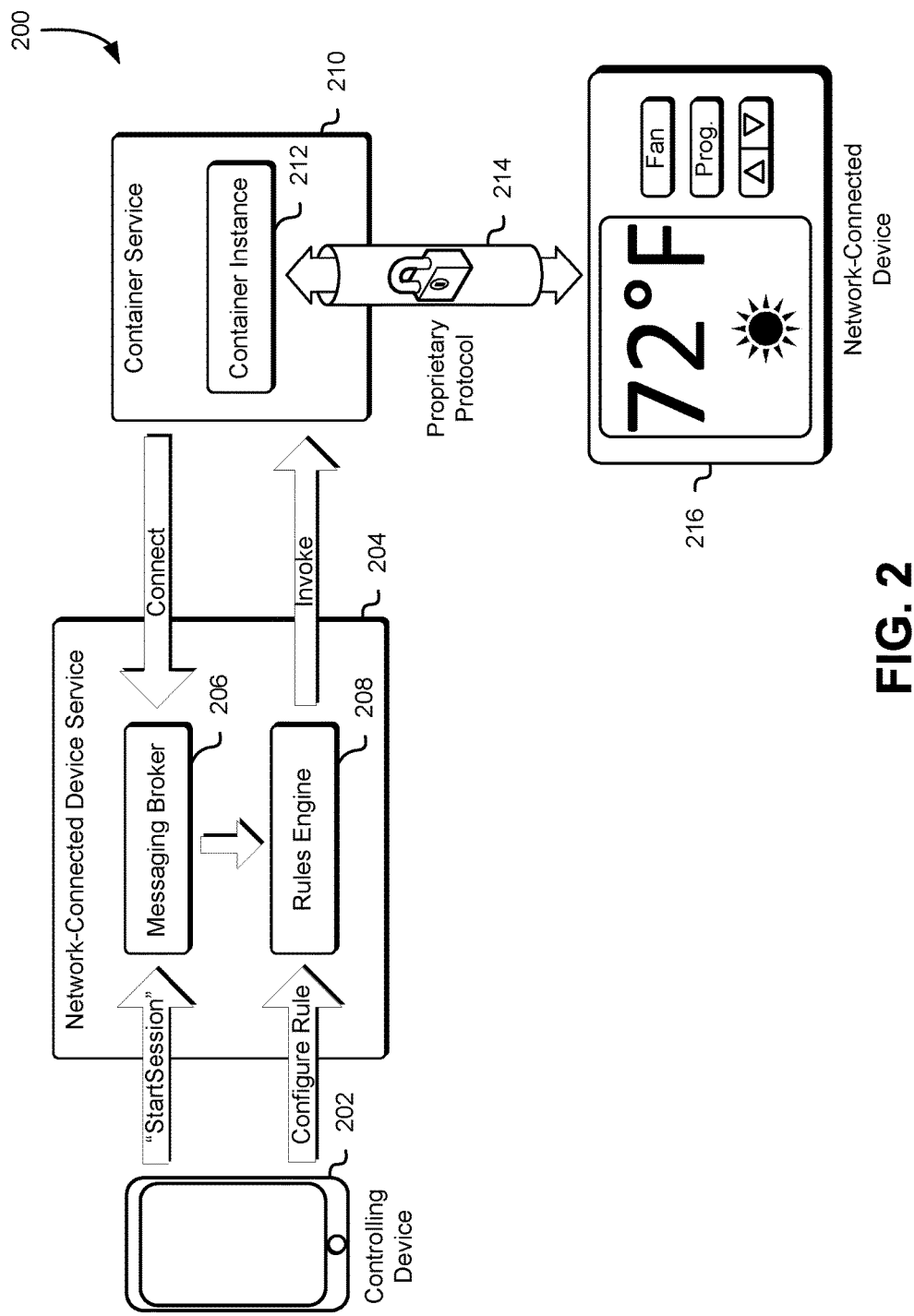
FIG. 2 shows an illustrative example of an environment in which a network-connected device service invokes a container instance to establish communications with a network-connected device in accordance with at least one embodiment.

As noted above, a user of a controlling device may transmit a request to a network-connected device service to establish a communications channel with a network-connected device that may utilize one or more proprietary protocols to transmit and receive messages. In response to the request, the network-connected device service may transmit a request to a container service to invoke a software container instance that may establish a communications session with the network-connected device using a proprietary protocol or any other communications protocol utilized by the network-connected device. Accordingly, FIG. 2 shows an illustrative example of an environment 200 in which a network-connected device service 204 invokes a container instance 212 to establish communications with a network-connected device 216 in accordance with at least one embodiment.

In the environment 200, a user of a controlling device 202 may interact with a rules engine 208 of the network-connected device service 204 to configure one or more rules that may be used to invoke a container instance 212 for use in establishing a communications channel with a network-connected device 216. The network-connected device service 204 may comprise one or more computer systems, such as device servers, that obtain state information and other data from network-connected devices and provide mechanisms to enable users to utilize their controlling device to interact and control one or more network-connected devices. The network-connected device service 204 may transmit and receives communications using HyperText Transfer Protocol (HTTP), MQ Telemetry Transfer (MQTT) protocol, or other communications protocols. The network-connected device service may further include additional components that may be utilized by a user of the controlling device 202 to establish a communications channel with the network-connected device 216. For instance, the network-connected device service 204 may include the aforementioned rules engine 208, which may include one or more computer systems that may be used by the user of the controlling device 202 to configure one or more rules that may be used to configure a container instance 212 that may be used to establish the communications channel with the network-connected device 216. Further, the network-connected device service 204 may include a messaging broker 206 that may receive requests from the controlling device 202 to establish a communications session with the network-connected device 216. The messaging broker 206 may comprise one or more computer systems that interact with the rules engine 208 to provide the received requests and that maintain one or more message topics for each network-connected device 216 to enable communication between the container instance 212 and the controlling device 202.

At any time, a user of a controlling device 202 may transmit a request to the messaging broker 206 of the network-connected device service 204 to invoke a container instance 212 that may be used to access a network-connected device 216. For instance, the controlling device 202 may transmit one or more API calls, such as a "StartSession" API call, to the messaging broker 206 to request that a container instance be invoked for a particular network-connected device 216. The request may specify a device identifier for the network-connected device 216 that may be used to identify the one or more rules applicable to the request. In response to the request, the messaging broker 206 may transmit the request to the rules engine 208 to enable the rules engine 208 to invoke the container instance 212. In some embodiments, the messaging broker 206 adds the request to a message topic for the network-connected device 216. The rules engine 208 may be subscribed to the message topic and may query the message topic to determine whether there are any new requests added to the message topic. If so, the rules engine 208 may obtain the new requests from the message topic.

In response to the request obtained from the messaging broker 206, the rules engine 208 may evaluate any rules configured by the user of the controlling device 202 that are pertinent to the request. For instance, the rules may specify an identifier of an existing container instance 212 provisioned by the user of the controlling device 202 that may be used to access the network-connected device 216. Alternatively, the rules may specify one or more configuration parameters for the container instance 212 that is to be invoked, such as the amount of memory and processing capacity allocated to the container instance 212. The rules engine 208 may utilize the information specified in the request and in the one or more rules provided by the user of the controlling device 202 to transmit a request to the container service 210 to invoke a container instance 212 that may be used to access the network-connected device 216.

The container service 210 may utilize the information in the request from the rules engine 208 to provision a container instance 212 that may be used to establish a communications session with the network-connected device 216. For instance, the request may specify a device identifier, device address, and the proprietary protocol 214 utilized by the network-connected device 216 to transmit and receive messages. Further, the information may specify one or more identifiers of a message topic maintained by the messaging broker 206 for the network-connected device 216. Based at least in part on the information obtained from the request, the container instance 212 may query a network-connected device database maintained by the network-connected device service 204 to obtain additional information about the network-connected device 216. For instance, the container instance 212 may obtain, from the network-connected device service 204, a client-generated session identifier that may be used to identify a particular message topic associated with the network-connected device 216 that may be used to transmit messages among the controlling device 202, the network-connected device service 204, and the container instance 212.

The container instance 212 may utilize the network address of the network-connected device 216 and the information regarding the protocol utilized by the network-connected device 216 to establish a communications session with the network-connected device 216. For instance, if the network-connected device 216 utilizes a proprietary protocol 214 that is distinct from HTTP, MQTT, or any other publicly-available communications protocol utilized by the network-connected device service 204, the container instance 212 may utilize the information provided in the request to identify the proprietary protocol 214 utilized by the network-connected device 216 and transmit a request to establish the communications session using the proprietary protocol 214.

If the communications session with the network-connected device 216 is successfully established by the container instance 212, the container instance 212 may transmit a message to the messaging broker 206 to indicate that the communications session has been established with the network-connected device 216. In some embodiments, the messaging broker 206 adds the message from the container instance 212 to the message topic designated for the network-connected device 216. Further, the messaging broker 206 may transmit a notification to the controlling device 202 to indicate that a new message has been added to the message topic. Alternatively, the messaging broker 206 may provide the message from the container instance 212 to the controlling device 202.

The controlling device 202 may publish one or more commands to be executed by the network-connected device 216 to the message topic designated for the network-connected device 216. In response to the publishing of these one or more commands, the messaging broker 206 may transmit a notification to the container instance 212 to indicate that one or more new messages have been added to the message topic. This may cause the container instance 212 to access the message topic through the messaging broker 206 to obtain the one or more commands provided by the controlling device 202. In some instances, the messaging broker 206 may transmit the one or more commands obtained from the controlling device 202 to the container instance 212, which may obviate the need for the container instance 212 to access the message topic to obtain the commands.

The container instance 212 may transmit the received one or more commands from the controlling device 202 to the network-connected device 216 through the communications session previously established by the container instance 212. The network-connected device 216 may execute the one or more commands and transmit, over the communications channel, messages indicating the status of execution of the commands, including whether any of the commands were executed successfully. In response to these messages, the container instance 212 may transmit the messages to the messaging broker 206, which may add the messages from the network-connected device 216 to the message topic designated for the network-connected device 216. Further, the messaging broker 206 may transmit a notification to the controlling device 202 to indicate that one or more new messages have been added to the message topic designated for the network-controlled device 216. The controlling device 202 may access the message topic and obtain the one or more messages from the network-connected device 216.

In some embodiments, if the container instance 212 is able to establish a communications session with the network-connected device 216, the user of the controlling device 202 can provide access to the management session to other operators of the network-connected device 216. For instance, a user of the controlling device 202 may provide the client-generated session identifier to another entity to enable the other entity to access the message topic designated for the network-connected device 216. This may enable the other entity to publish one or more executable commands to the message topic, thereby causing the container instance 212 to obtain the one or more executable commands and to provide these commands to the network-connected device 216. Additionally, the other entity may obtain, from the message topic, any messages provided by the network-connected device 216 through the container instance 212. Thus, these other entities may utilize the network-connected device service 204 to interact and operate the network-connected device 216.

Figure 3:
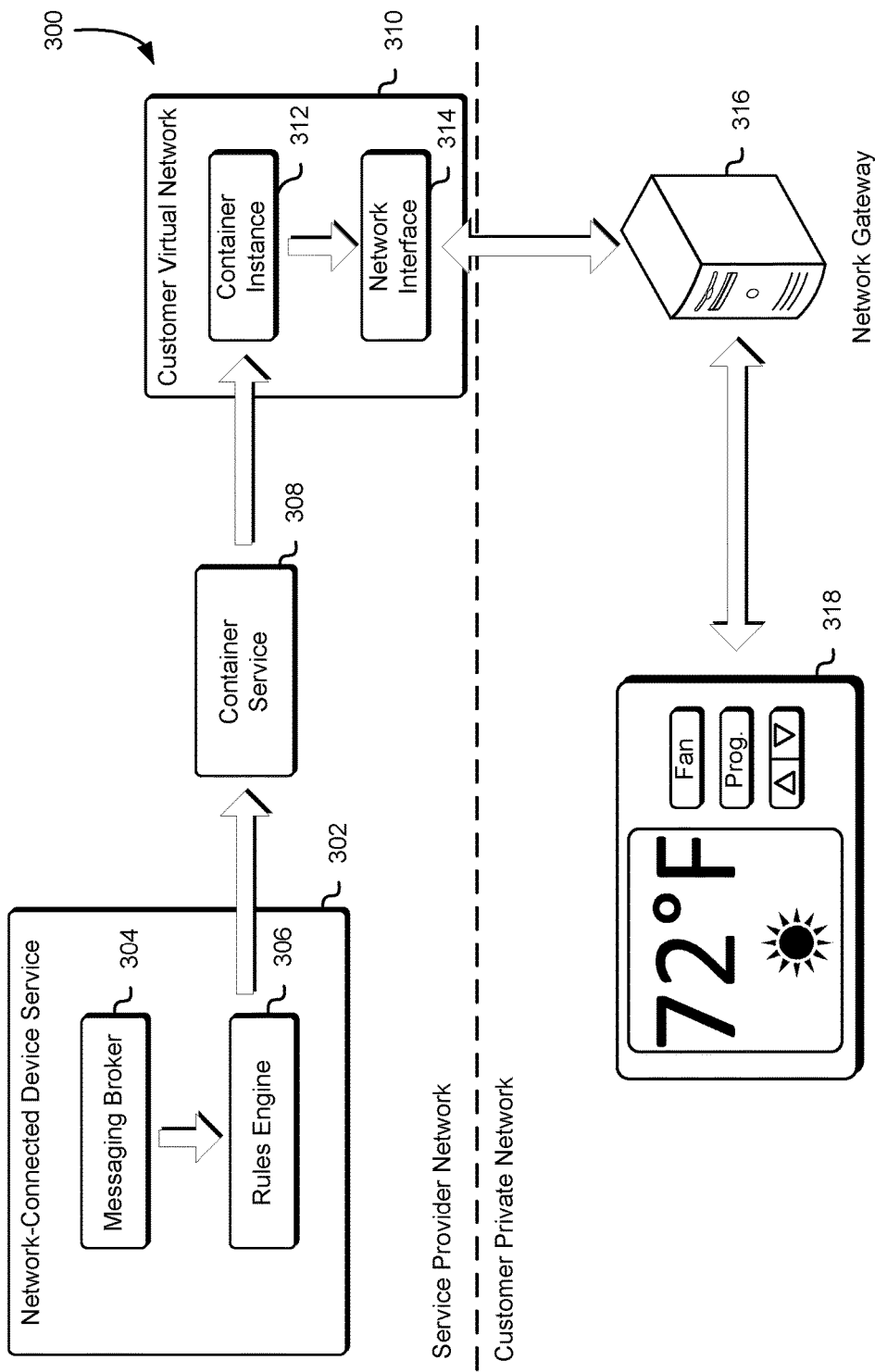
FIG. 3 shows an illustrative example of an environment in which a network-connected device service utilizes a container service to invoke a container instance within a customer virtual network to establish communications with a network-connected device in accordance with at least one embodiment.

In an embodiment, the network-connected device is maintained within a customer private network that is distinct from the network wherein the network-connected device service and the container service reside. The container service may not have direct access to the customer private network. However, the container service may launch the container instance within a customer virtual network that includes a network interface usable to access the customer private network and the network-connected device. Accordingly, FIG. 3 shows an illustrative example of an environment 300 in which a network-connected device service 302 utilizes a container service 308 to invoke a container instance 312 within a customer virtual network 310 to establish communications with a network-connected device 318 in accordance with at least one embodiment.

In the environment 300, the messaging broker 304 of the network-connected device service 302 may receive a request from a user of a controlling device to provision a container instance 312 that can be used to establish a communications session with a particular network-connected device 318. The controlling device may have previously configured a set of rules for provisioning of the container instance 312, as described above in connection with FIG. 2. However, the set of rules may further specify one or more domain credentials that may be utilized to access a network gateway 316 within the customer private network. The set of rules may also specify an identifier of a customer virtual network 310 within the service provider network through which the container instance 312 may access the network gateway 316 within the customer private network.

The container service 308 may receive a request from the rules engine 306 to invoke the container instance 312 within the customer virtual network 310. In response to the request, the container service 308 may use the information specified in the request to launch the container instance 312 within the customer virtual network 310. Similar to the container instance 212 described above in connection with FIG. 2, the container instance 312 may query a network-connected device database maintained by the network-connected device service 302 to obtain additional information about the network-connected device 318. Further, the container instance 312 may obtain, from the network-connected device service 302, the domain credentials necessary to access the network gateway 316 operating within the customer private network.

The customer virtual network 310 may include a virtual network interface 314, which may include a network address according to the communications protocol of the network gateway 316 and the network-connected device 318 to enable communications between the customer virtual network 310 and the customer private network. In an embodiment, the container instance 312 provides the domain credentials obtained from the network-connected device service 302 to the virtual network interface 314, as well as a request to establish a communications session with the network gateway 316 through use of the communications protocol utilized by the network gateway 316 and the network-connected device 318. The virtual network interface 314 may transmit the request from the container instance 312, and the provided domain credentials to the network gateway 316.

In response to receiving the domain credentials from the virtual network interface 314, the network gateway 316 may access a user account data store to determine whether the domain credentials are authentic and, if so, determine whether the user is authorized to access the network-connected device 318. If the network gateway 316 is able to authenticate the user and determine that the user has access to the network-connected device 318, the network gateway 316 may provide an acknowledgment to the container instance 312 that the user has been authenticated and is authorized to access the customer private network and the network-connected device 318 to perform one or more actions. The container instance 312 may utilize the acknowledgment from the network gateway 316 to generate a token, which may specify one or more user identifiers and a protocol address of the network gateway 316. This token may enable the container instance 312 to access the network gateway 316, establish a communications session with the network gateway 316, and provide the received token to enable the network gateway 316 to verify the container instance 312. If the network gateway 316 is able to verify the container instance 312 through use of the token, the network gateway 316 may direct the container instance 312 to the network-connected device 318.

Figure 4:
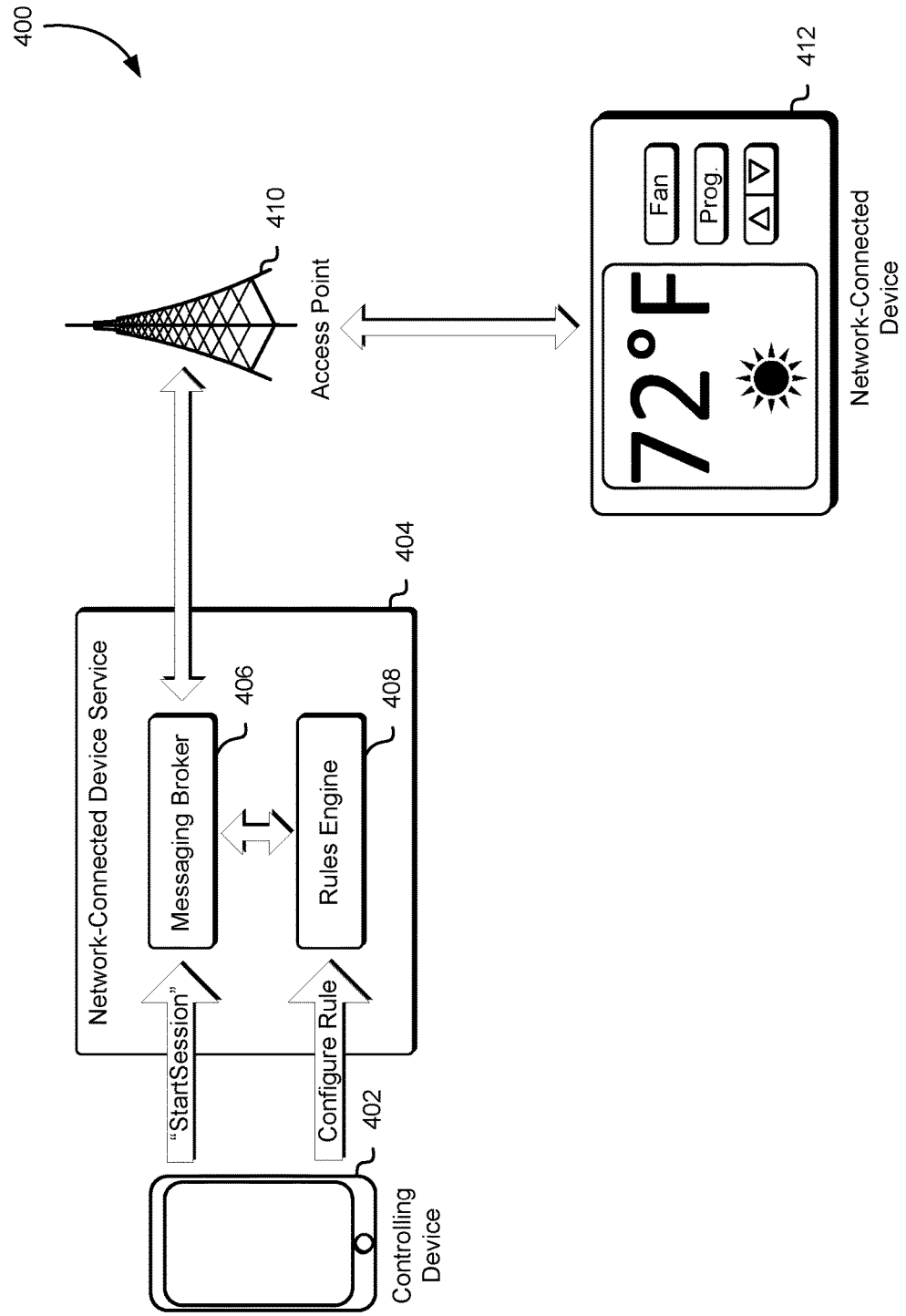
FIG. 4 shows an illustrative example of an environment in which a network-connected device service establishes communications between a controlling device and a network-connected device through an access point of a mobile communications network in accordance with at least one embodiment.

In an embodiment, a user of a controlling device transmits a request to a network-connected device service to establish a communications channel with a network-connected device that may be connected to a mobile communications network. In response to the request, the network-connected device service may transmit one or more messages to the network-connected device over the mobile communications network to establish the communications channel with the network-connected device and to enable the user of the controlling device to submit one or more commands to the network-connected device that are to be executed by the network-connected device. Accordingly, FIG. 4 shows an illustrative example of an environment 400 in which a network-connected device service 404 establishes communications between a controlling device 402 and a network-connected device 412 through an access point 410 of a mobile communications network in accordance with at least one embodiment.

In the environment 400, a user of a controlling device 402 may interact with a rules engine 408 of the network-connected device service 404, through an interface of the network-connected device service 404, to configure one or more rules that may be used to establish a communications channel with a network-connected device 412. The network-connected device service may include one or more components that may be utilized by a user of the controlling device 402 to establish a communications channel with the network-connected device 412. For instance, the network-connected device service 404 may include the aforementioned rules engine 408, which may include one or more computer systems that may be used by the user of the controlling device 402 to configure one or more rules that may be used to identify the network-connected device 412 to which a communications channel may be established. Further, the network-connected device service 404 may include a messaging broker 406 that may receive requests from the controlling device 402 to establish a communications session with the network-connected device 412. The messaging broker 406 may comprise one or more computer systems that interact with the rules engine 408 to provide the received requests and that maintain one or more message topics for each network-connected device 416 to enable communication between the network-connected device 412 and the controlling device 402.

At any time, a user of a controlling device 402 may transmit a request to the messaging broker 406 of the network-connected device service 404 to establish a communications channel with a particular network-connected device 412. For instance, the controlling device 402 may transmit one or more API calls, such as a "StartSession" API call, to the messaging broker 406 to request that a communications channel be established for a particular network-connected device 412. The request may specify a device identifier for the network-connected device 412 that may be used to identify the one or more rules applicable to the request. In response to the request, the messaging broker 406 may transmit the request to the rules engine 408 to enable the rules engine 408 to identify one or more rules that are applicable to the request. In some embodiments, the messaging broker 406 adds the request to a message topic for the network-connected device 412. The rules engine 408 may be subscribed to the message topic and may query the message topic to determine whether there are any new requests added to the message topic.

The one or more rules applicable to the request may specify a plurality of attributes of the network-connected device 412 as provided by the controlling device 402. For instance, the one or more rules may specify network information for the network-connected device 412 that may be used to establish the communications channel with the network-connected device 412. For instance, the one or more rules may specify an address of the network-connected device 412 within a mobile communications network. Additionally, or alternatively, the one or more rules may specify an identifier of an access point 410 to which the network-connected device 412 is connected or subscribed. The rules engine 408 may transmit the one or more rules for the network-connected device 412 to the messaging broker 406 for use by the network-connected device service 404.

The network-connected device service 404 may evaluate the one or more rules from the rules engine 408 to identify the location of the network-connected device 412, as well as the access point 410 through which any messages are to be transmitted to the network-connected device 412. Using the information specified in the one or more rules from the rules engine 408, the network-connected device service 404 may generate one or more Short Message Service (SMS) messages or other electronic messages that include network information of the network-connected device service 404, as well as an identifier for a message topic maintained by the messaging broker 406 that can be used to obtain any incoming commands from the connected device 402 or to provide status information regarding any operations performed by the network-connected device 412 on behalf of the controlling device 402. The access point may obtain the one or more SMS messages or other electronic messages from the network-connected device service 404 and provide these messages to the network-connected device 412.

In response to the one or more SMS messages or other electronic messages from the network-connected device service 404, the network-connected device 412 may transmit one or more messages to the network-connected device service 404, through the access point 410, to indicate that the communications channel has been successfully established. The network-connected device service 404 may cause the messaging broker 406 to add a message to the message topic designated for the network-connected device 412 to indicate that the communications channel has been established successfully. Further, the messaging broker 406 may transmit a notification to the controlling device 402 to indicate that a new message has been added to the message topic. Alternatively, the messaging broker 406 may provide the message to the controlling device 402.

The controlling device 402 may publish one or more commands to be executed by the network-connected device 412 to the message topic designated for the network-connected device 412. In response to the publishing of these one or more commands, the messaging broker 406 may transmit a notification to the network-connected device 412, through the access point 410, to indicate that one or more new messages have been added to the message topic. This may cause the network-connected device 412 to access the message topic through the messaging broker 406 to obtain the one or more commands provided by the controlling device 402. In some instances, the messaging broker 406 may transmit the one or more commands obtained from the controlling device 402 to the network-connected device 412 through one or more SMS or other electronic messages to the device 412, which may obviate the need for the network-connected device 412 to access the message topic to obtain the commands.

The network-connected device 412 may execute the one or more commands and transmit, over the communications channel, messages indicating the status of execution of the commands, including whether any of the commands were executed successfully. In response to these messages, the messaging broker 406 may add the messages from the network-connected device 412 to the message topic designated for the network-connected device 412. Further, the messaging broker 406 may transmit a notification to the controlling device 402 to indicate that one or more new messages have been added to the message topic designated for the network-controlled device 412. The controlling device 402 may access the message topic and obtain the one or more messages from the network-connected device 412.

Figure 5:
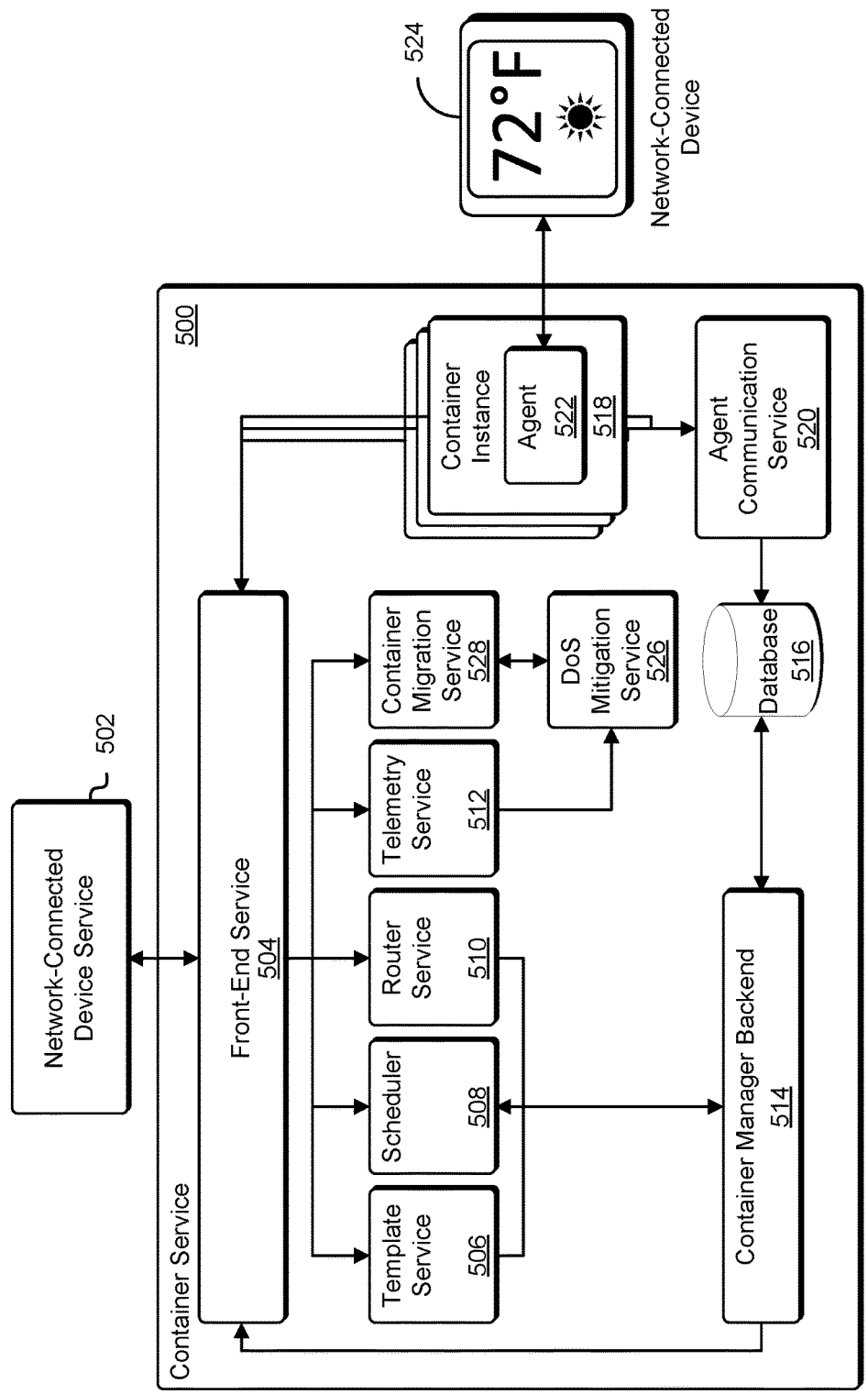
FIG. 5 shows an illustrative example of a container service in accordance with at least one embodiment.

FIG. 5 shows an illustrative example of a container service 500 in accordance with at least one embodiment. As illustrated in FIG. 5, the environment of the example container service 500 may include a network-connected device service 502 communicating through a front-end service 504 to manage one or more containers within one or more container instances 518. In some examples, a "container instance" may refer to a computer system instance, virtual or non-virtual (e.g., a physical computer system running an operating system), that is configured to launch and run software containers. Thus, the one or more container instances 518 may be virtual machines configured to launch and execute software containers.

A container encapsulation system provided by or interfaced to the container service 500 may allow a user (e.g., user of a controlling device) to configure one or more applications within a container of an operating system which supports containers. The running processes and resources within the container may be isolated from other processes of the parent container instance and from the running processes and resources within other containers of the same host system. The user may specify the amount of memory and processing capacity allocated to the container. The base container and the applications and data within it may then be packaged as an image, including one or more programs, data, and any system dependencies (e.g., libraries, files, etc.) that are needed for the programs to run on the operating system of the container instance. In some examples, an "image" may refer to an entire copy of a particular state of the base container at the time the image was generated. The image thereafter may be used to launch one or more identical containers, each of which may be assigned the specified amount of resources and may be isolated from each other. The containers may be launched on the same or different physical machines and each container may be expected to run in exactly the same way as the base container.

Each of the container instances 518 may be configured to contain one or more agents, such as the agent 522. The container service 500 may be comprised of a set of services, including a template service 506, one or more schedulers 508, a router service 510, a telemetry service 512, a container migration service, and a denial of service mitigation service 526. Because the container service 500 may be configured as a multitenant service (i.e., the resources of the container service 500 may serve multiple customers concurrently), and because the services provided by the container service 500 exist outside and separate from the container instances 518, the network-connected device service 502 need not install individual software applications within its respective container instances 518 to provide the functionality afforded by the services. The network-connected device service 502 may utilize the functionality provided by these services by making web service application programming interface function calls through the front-end service 504, which may be configured to receive requests from the network-connected device service 502 and forward the requests to the appropriate service, such as the appropriate container manager backend service 514.

The scheduler 508 may be configured to launch tasks within the described cluster. Alternatively, the network-connected device service 502 may implement its own scheduler, rather than the scheduler 508. The network-connected device service 502 may design and/or upload a placement algorithm to be used by its own scheduler, or may select from a list of possible placement algorithms provided to the network-connected device service 502 by the computing resource service provider. The container service 500 may determine, based on available resources, whether to accept or reject placement decisions made by the network-connected device service 502 scheduler.

The scheduler 508 may be a multitenant service configured to optimally schedule a set of tasks to run with a cluster. In this way, the network-connected device service 502 need not choose where the tasks should be executed. The placement scheme of the scheduler 508 may be configured to distribute tasks evenly over the cluster (e.g., round robin fashion, stochastic distribution scheme, etc.), and may be configured to distribute tasks based on a current or projected resource consumption by the cluster, in order to make the most efficient use of available resources. The scheduler 508 may obtain cluster manager metadata and other information about the availability of the container instances 518 in a cluster via the container manager backend services 514. The cluster manager metadata and other information may include data about the current state of the container instances 518 assigned to the cluster, available resources within the container instances, containers running within the container instances, and other information usable by the scheduler 508 to make placement decisions.

The scheduler 508 may distribute tasks based on security rules, security groups, and/or security roles, have affinity, and anti-affinity. For example, tasks within a certain security group may be configured to be launched on the same container instance whenever possible or practicable, or, conversely, may be scheduled to be launched in separate container instances. As another example, tasks may be assigned to certain security groups or designated to have certain security roles, and, based on the particular security group assigned or security role designated, a task may be assigned to run in a specific cluster or specific cluster instances or may have priority for resources over other tasks. Task distribution based on affinity/anti-affinity includes assigning "tags" indicating relationships between containers, container instances, and tasks. As an example of distribution based on affinity, two container instances may be tagged as "general" and one container instance may be tagged as "database." In a task definition, a task could be specified with a "general" launch constraint providing affinity that the task is to be launched into one (or more) of the container instances tagged as general. As an example of task distribution of anti-affinity, certain container instances may be tagged as "secure-credit-card-processing" and certain other container instances may be tagged as "http-website." Because http-website containers may be serving traffic from untrusted outside entities, it may be desirable not to share such containers with credit card processing tasks. Thus, a task definition can be configured to indicate that "http-website" is anti-affinity to credit card processing tasks to ensure that credit card processing containers are not launched in "http-website" tagged container instances. In this example, the scheduler 508 can be configured to parse any tags in a task definition and use it to filter out container instances that do not meet the criteria associated with the tag. Next, the scheduler 508 can select a container instance from the filtered set to host the container.

Containers may also be configured to utilize other resources provided by the computing resource service provider. For example, each container may be configured with a virtual network interface to allow the container to communicate through the virtual network to other containers and/or other resources of the computing resource service provider. Likewise, security credentials may be assigned on a per-container basis so that containers have their own security credentials to access the other resources provided by the computing resource service provider. Additionally, the container service may be configured to integrate with a load-balancing service to load-balance workloads directed at the containers. For example, a network-connected device service 502 may present a list of communications protocol addresses associated with virtual networks of the network-connected device service 502 containers and/or network-connected device service 502 instances to a load-balancer of the load-balancing service and instruct the load-balancer to balance workloads between the communications protocol addresses. In addition, the container service may be integrated with an auto-scaling service to allow resources utilized by the containers to be dynamically adjusted as needed.

In some cases, the scheduler 508 may be configured to maximize available resources. For example, a cluster may be utilized primarily for running long-running services, and a need arises for running one or more short-lived batch jobs. In such an example, a scheduler configured to maximize available resources may look for an instance with just enough processing power to support the batch jobs as a best-fit location for the batch jobs. Alternatively, the scheduler 508 may look for an instance utilizing the least of its processing power and schedule the batch jobs with this instance.

In some implementations, a meta-scheduler is configured to run hierarchically on top of one or more schedulers, and the meta-scheduler may decide where to launch the batch jobs. For example, in an implementation there are two types of tasks: short term batch job tasks and long-term services. The two types of tasks may have different placement rules, such as it may be desirable to distribute the service tasks evenly among the available container instances in one or more specified clusters, whereas the batch job tasks may be configured to run in any available container instance with space processing cycles. In some cases, a different scheduler may be assigned to each set of placement rules. However, in cases where such placement rules are competing or in conflict with each other or in cases where an appropriate scheduler must be determined and assigned to a particular task, the meta-scheduler may determine which competing task should prevail, synchronize information between schedulers, or determine the appropriate scheduler for placing a task.

Because containers may be run in any available container instance with sufficient resources in the cluster, containers may be scaled up or down within the cluster as needed, provided enough container instances are available. If the number of container instances in a cluster is insufficient, additional container instances may be created and registered to the cluster through the cluster manager. If an overabundance of container instances exists in the cluster, some container instances may be deregistered from the cluster via the cluster manager. The scheduler 508 may also be configured to start tasks within a task definition file, and determine where to place the tasks within the cluster. For example, the scheduler 508 may determine to distribute tasks evenly between the container instances of the cluster, distribute tasks in some chi-squared distribution, or may distribute tasks among container instances of a cluster according to some other heuristic or set of constraints.

The container service 500 may interact with an authentication system of the computing resource service provider, to authenticate application programming interface calls made to the front-end service 504. In some embodiments, separate security groups and security roles are configured and assigned to different containers on a single host. The container service 500 may also be configured to launch containers and container instances 518 within a customer virtual network, as described above in connection with FIG. 3.

The template service 506 may be configured to allow the network-connected device service 502 to define a task definition for its containers. In some examples, a "task definition" may refer to a script or set of metadata that may define a group of containers; e.g., the number of containers, their types, their components, their relationships to other containers, information describing associated instances, and other metadata. Task definitions may also specify that groups of containers are to be launched in coordination. The template service 506 may receive task definitions from the network-connected device service 502, store the task definitions in the database 516, and allow the network-connected device service 502 to create, view, update, delete, and otherwise manage their task definitions.

The template service 506 may grant the network-connected device service 502 the ability to define a task definition. The template service 506 may allow the network-connected device service 502 with the ability to provide the task definition by uploading a task definition file or may provide the task definition by allowing the network-connected device service 502 to select from various options and/or change default settings to dynamically create a task definition file. The template service 506 may allow the network-connected device service 502 to register a task definition. The template service 506 may also provide an editing interface for editing currently registered task definitions. The template service 506 may register the task definitions at least in part, by providing the task definitions to the container manager backed service 514 to be stored in in the database 516.

In some examples, a "fleet" may refer to a set of computer systems (virtual or physical) running instances, such as the container instances 518 of the present disclosure. A fleet may be subdivided into sub-fleets, and each sub-fleet may be supported by a corresponding container manager back-end service and agent communication service dedicated to that sub-fleet. The agent communication services 520 may be configured to communicate with the agents 522 running on container instances within the sub-fleet.

The container manager backend services 514 may be configured to provide other management services and resources to the sub-fleet on the backend, such as the cluster management software or cluster manager metadata described in the present disclosure. The container manager backend services may be configured to receive task definitions from the template service 506, store the task definitions in the database 516, receive cluster manager metadata from container instances 518 or the agent communication services 520, and provide task definition information and the cluster manager metadata to the scheduler 508 or a network-connected device service 502 installed scheduler upon request. The container manager backend services may be configured to provide information about a specified cluster, such as cluster manager metadata.

The agent communication services 520 and container manager backend services 514 may be implemented on separate computer systems within the sub-fleet, separate virtual machine instances within the sub-fleet, may share the same computer systems and/or virtual machine instances within the sub-fleet, or may run on computer systems separate from but in communication with their respective sub-fleet. There may be multiple container instances 518 per sub-fleet. In some cases, each sub-fleet may represent a single cluster. In other cases, clusters may span multiple sub-fleets. In still other cases, each sub-fleet may host more than one cluster. The router service 510 may be configured to route requests from the front-end service 504 to the appropriate sub-fleet. In some embodiments, the router service 510 route requests to a single sub-fleet. In other embodiments, the router service routes requests between multiple sub-fleets.

The container migration service 528 may be a service provided by the computing resource service provider for determining whether to migrate and application executing within a container instance of the container instances 518 to a container instance of the container instances 518 closer in proximity to a target application than the container instance in which the application is currently executing. The determination may be made based on factors such as an amount of communications (e.g., frequency or volume of traffic) between the application and the target application, or a type of request made by the application to the target application.

The denial of service mitigation service 526 may be a service provided by the computing resource service provider for determining a level of threat posed by an application, which has met criteria for being migrated closer in proximity to another application. The denial of service mitigation service 526 may be provided using one or more virtual and/or non-virtual computing systems under the control of the computing resource service provider. The denial of service mitigation service 526 may perform processes for determining the level of threat and taking appropriate action (e.g., halting a migration, proceeding with the migration, performing a threat/denial of service mitigation action, etc.) based on the level of threat.

The telemetry service 512 may be configured to aggregate control group metrics (e.g., information about the processes running within the containers) and container logs and provide the aggregated metrics and logs to a resource monitoring service to allow the network-connected device service 502 to monitor resource utilization, such as processor, storage, and network usage, of their respective container instances. Control group metrics include information such as the amount of memory used by processes of the containers, number of times that a process triggered a page fault, central processing unit usage by the processes of the containers, time during which the central processing units were executing system calls on behalf of processes of the containers, number of reads and writes by the processes of the containers, and number of input/output operations queued for the processes of the containers. In some implementations, the telemetry service 512 may obtain its data directly from one or more agents, such as the agent 522. In other implementations, the telemetry service 512 may obtain its data indirectly from one or more agents, such as through the front-end service 504 or through a connection (not shown) to the database 516.

The container manager backend services 514 may be configured to receive placement requests from the network-connected device service 502 for its containers through the front-end service 504, and may ensure that the requested resources are available for the containers. The container manager backend services 514 may then write the desired container state to the database 516. In some implementations, the container manager backend services is responsible for the cluster manager metadata, which may be stored in the database 516, and provided to the scheduler 508 or customer-installed scheduler when requested.

The database 516 may be a data store located within the distributed computing system of the container service 500, or may be a data store of a different service of a computing resource service provider, such as a relational database service. In some embodiments, the database 516 is a set of distributed databases that share a transaction log. The agent communication services 520 may be configured to store the status of the agents 522 and/or other information provided by the agents 522 to the agent communication service 520 in the database 516. In some embodiments, communication by other components of the container service, with containers and the container instances 518 is performed through the agent communication services 520. Each fleet may have at least one agent communication service which relays the messages between the agents 522 of the fleet.

The agents 522 may be software applications configured to run in instances owned by the network-connected device service 502 and may track communications (e.g., packets, requests, messages, etc.) between applications running in software containers of the container instances 518. The agents 522 themselves may be running within software containers. The agents 522 may be configured to launch automatically when their respective container instances 518 are instantiated. In an embodiment, an agent 522 operating within a container instance 518 provisioned in response to a request from the network-connected device service 502 queries a network-connected device database of the network-connected device service 502 to obtain information regarding a network-connected device 524 to which the container instance 518 is to establish a communications session.

The agent 522 may utilize the information received from the network-connected device service 502 to locate the network-connected device 524 and establish a communications session with the network-connected device 524 using the communications protocol (e.g., proprietary protocol, IP, etc.) of the network-connected device 524. If the agent 522 is able to establish the communications session with the network-connected device 524, the container instance 518 may transmit a message, through the front-end service 504, to the network-connected device service 502 to indicate that the communications session to the network-connected device 524 has been established. In some instances, the agent 522 may add the message to a message topic maintained by the network-connected device service 502 that is designated for the particular network-connected device 524.

In some embodiments, the agent 522 further evaluates the message topic designated for the particular network-connected device 524 to determine whether a controlling device has submitted one or more commands that are to be executed by the network-connected device 524. The agent 522 may evaluate the message topic periodically or aperiodically, such as in response to one or more triggering events. For instance, if a controlling device adds one or more commands to be executed by the network-connected device 524 to the message topic, the network-connected device service 502 may transmit a notification to the front-end service 504 indicating that these one or more commands are available through the message topic. The front-end service 504 may transmit the notification to the agent 522 of the container instance 518. In response to the notification, the agent 522 may retrieve the one or more commands from the message topic and transmit the one or more commands to the network-connected device 524 over the communications session. This may cause the network-connected device 524 to execute the one or more commands.

The network-connected device 524 may transmit one or more messages over the communications session to the agent 522 to indicate whether the one or more commands have been executed successfully. The agent 522 may transmit these one or more messages from the network-connected device 524 to the network-connected device service 502 in order to add the one or more messages to the message topic designated for the network-connected device 524. In response to the addition of these messages to the message topic, the network-connected device service 502 may transmit a notification to a controlling device subscribed to the message topic to indicate that one or more messages have been added to the message topic. Alternatively, the network-connected device service 502 may allow the controlling device to access the message topic at its discretion to obtain the one or more messages.

The container service 500 may be integrated with other services of a computing resource service provider, such as the network-connected device service 502. For example, the container instances may be tagged and/or assigned to an auto-scaling group of an auto-scaling service of the computing resource service provider. In this manner, the auto-scaling service may monitor resource usage by the container instances and may dynamically adjust/allocate resources as needed, such as a sudden increase in resource demand by the container instances. Likewise, the container service 500 may integrate with a load-balancer service of the computing resource service provider. For example, the load-balancer service may distribute traffic to the containers or container instances in order to balance the workload between the container instances.

Figure 6:
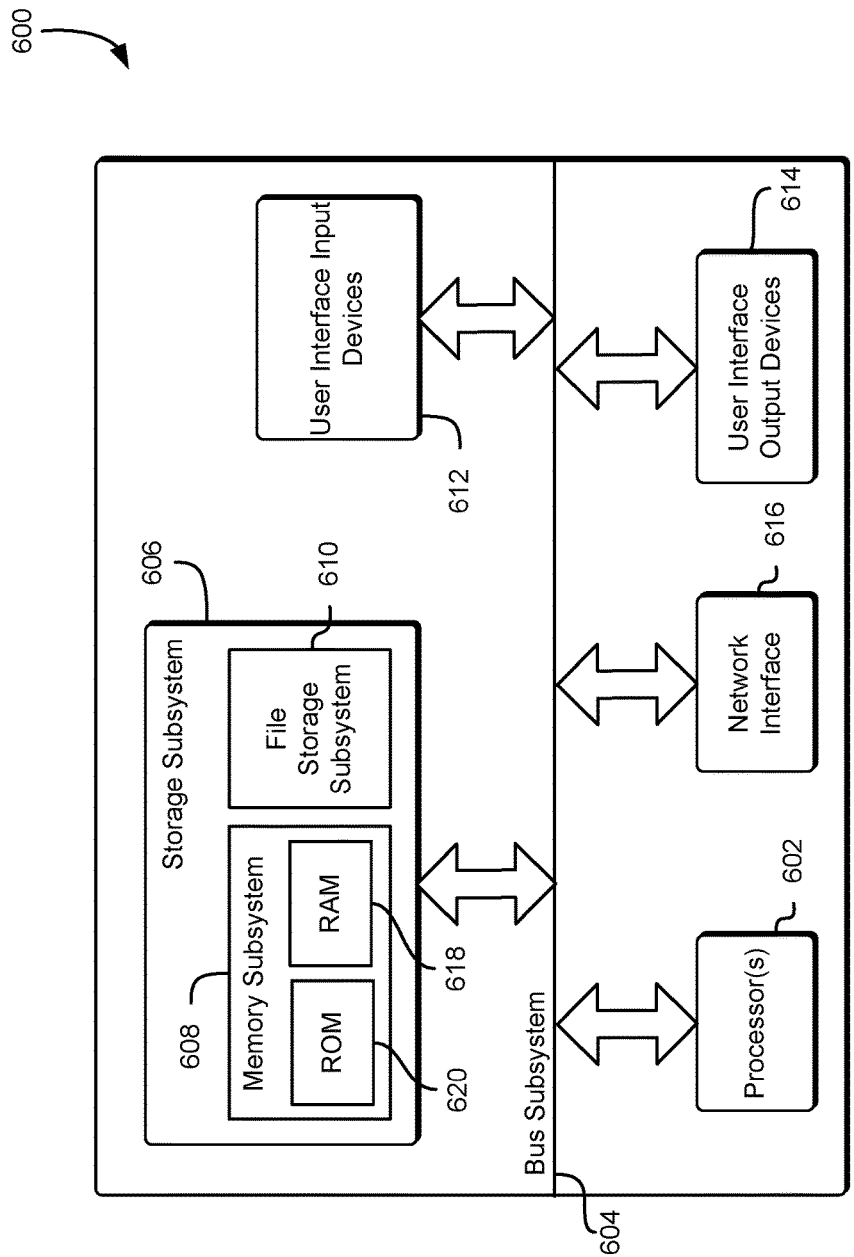
FIG. 6 shows an illustrative example of an example device system that may be used in accordance with at least one embodiment.

FIG. 6 shows an illustrative example of an example device system 600 that may be used in accordance with at least one embodiment. In various embodiments, the device system 600 may be used to implement any of the systems illustrated herein and described above. For example, the device system 600 may be used to transmit requests to the network-connected device service to provision a container instance that can be used to establish a communications session with a network-connected device. Further, the device system 600 may be used to transmit commands to the network-connected device service to cause the network-connected device to perform one or more operations. Alternatively, the device system 600 may correspond to the network-connected device, which may communicate with the container instance over the communications session to provide state information and to perform one or more operations based at least in part on commands received from the container instance.

As shown in FIG. 6, the device system 600 may include one or more processors 602 that may be configured to communicate with and are operatively coupled to a number of peripheral subsystems via a bus subsystem 604. These peripheral subsystems may include a storage subsystem 606, comprising a memory subsystem 608 and a file storage subsystem 610, one or more user interface input devices 612, one or more user interface output devices 614, and a network interface subsystem 616, although not all device systems may include the aforementioned components and may include additional, fewer, or alternative components. The bus subsystem 604 may provide a mechanism for enabling the various components and subsystems of device system 600 to communicate with each other as intended. Although the bus subsystem 604 is shown schematically as a single bus, alternative embodiments of the bus subsystem may utilize multiple busses.

The network interface subsystem 616 may provide an interface to other device systems and networks. The network interface subsystem 616 may serve as an interface for receiving data from and transmitting data to other systems from the device system 600. For example, the network interface subsystem 616 may enable the network-connected device to connect to a wireless network such that the network-connected device may transmit and receive data over a communications session with the container instance. Additionally, the network-connected device may receive transmissions from the container instance through a similar wireless access point. The network interface subsystem 616 may also facilitate the receipt and/or transmission of data on other networks.

The user interface input devices 612 may include one or more buttons, a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the device system 600.

User interface output devices 614 may include a display subsystem, a printer, or non-visual displays such as audio output devices, etc. The display subsystem may be a CRT, a flat-panel device such as a LCD, LED display, or a projection or other display device. In general, use of the term "output device" is intended to include all possible types of devices and mechanisms for outputting information from the device system 600. The output device(s) 614 may be used, for example, to present user interfaces to facilitate user interaction with applications performing processes described herein and variations therein, when such interaction may be appropriate.

The storage subsystem 606 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, may be stored in the storage subsystem 606. These application modules or instructions may be executed by the one or more processors 602. The storage subsystem 606 may additionally provide a repository for storing data used in accordance with the present disclosure. The storage subsystem 606 may comprise a memory subsystem 608 and a file/disk storage subsystem 610.

The memory subsystem 608 may include a number of memories including a main random access memory (RAM) 618 for storage of instructions and data during program execution and a read only memory (ROM) 620 in which fixed instructions may be stored. The file storage subsystem 610 may provide a non-transitory persistent (non-volatile)

storage for program and data files, and may include a hard disk drive, a floppy disk drive along with associated removable media, a Compact Disk Read Only Memory (CD-ROM) drive, an optical drive, removable media cartridges, and other like storage media.

The device system 600 may be of various types including a portable computer device, tablet computer, a workstation, or any other data processing system that may provide portability for a merchant or other user of the device. Additionally, the device system 600 may include one or more connectors (e.g., USB, a headphone jack, Lightning® connector, etc.) that may be used to connect the device system 600 to another device. Due to the ever-changing nature of computers and networks, the description of the device system 600 depicted in FIG. 6 is intended only as a specific example for purposes of illustrating the preferred embodiment of a network-connected device or a controlling device. Many other configurations having more or fewer components than the system depicted in FIG. 6 are possible.

Figure 7:
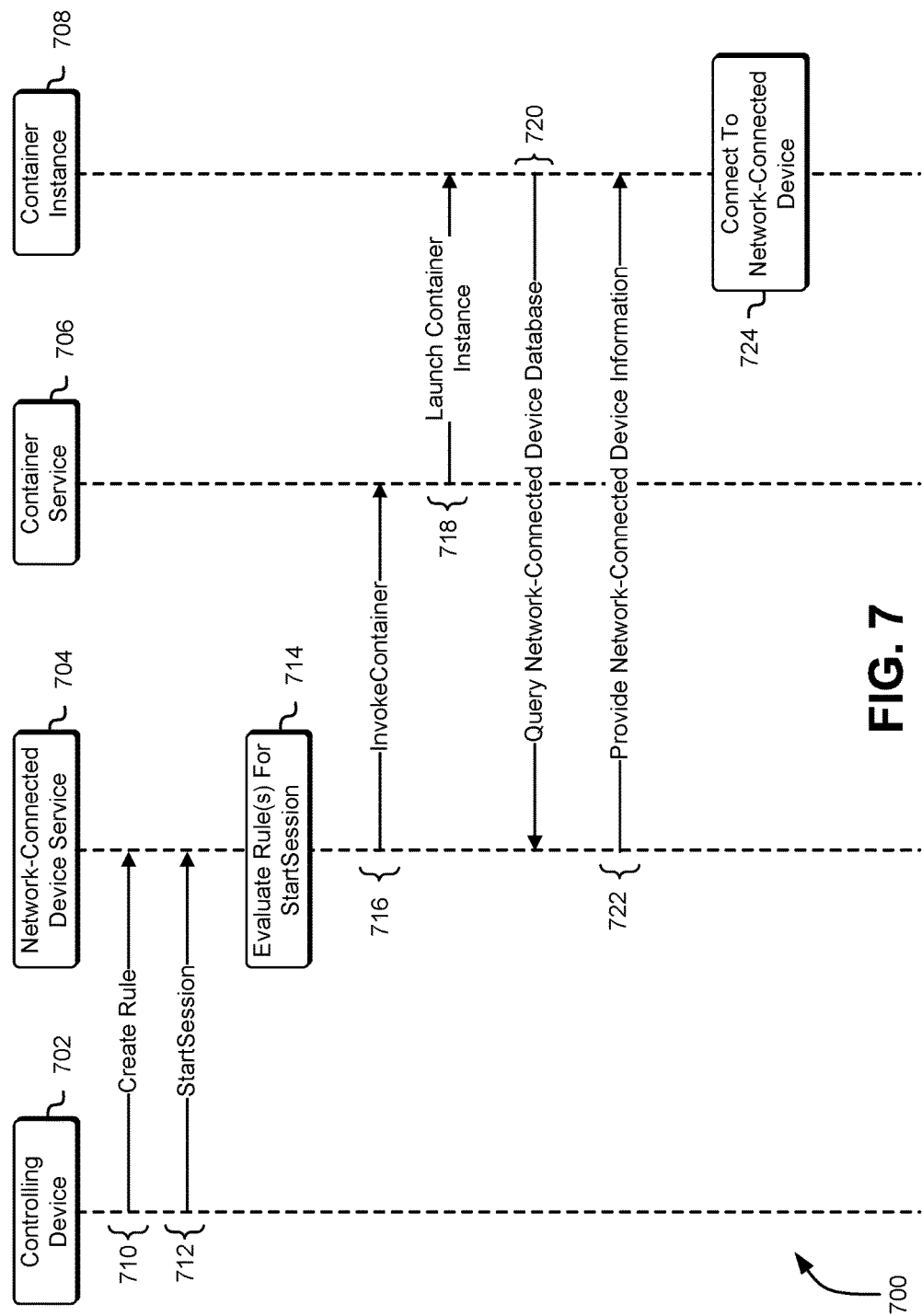
FIG. 7 shows an illustrative example of a message flow diagram for establishing communications between a controlling device and a network-connected device through use of a container instance in accordance with at least one embodiment.

As noted above, a user of a controlling device may create one or more rules for establishing a container instance that may be used to connect to a particular network-connected device. In response to a request obtained from a controlling device to start a session with the network-connected device, a network-connected device service may obtain the one or more rules created by the user and transmit a request to a container service to invoke a container instance that satisfies the one or more rules. This container instance may initiate a communications session with the network-connected device through use of the communications protocol of the network-connected device. Accordingly, FIG. 7 shows an illustrative example of a message flow diagram 700 for establishing communications between a controlling device 702 and a network-connected device through use of a container instance 708 in accordance with at least one embodiment.

In an embodiment, a user of a controlling device 702 accesses a network-connected device service 704 to create 710 one or more rules that may be used to determine the configuration of the container instance 708 that is to be used to access a particular network-connected device and to locate the network-connected device, such as through network addresses or other contact information. The network-connected device service 704 may include a rules engine, such as the rules engine described above in connection with FIGS. 2 and 3, that may obtain the rules from the controlling device 702 and store the rules within a dedicated message topic for the identified network-connected device. Thus, if the controlling device 702 submits a request to start a communications session with the network-connected device, such as through use of a "StartSession" 712 API call or MQTT message, the network-connected device service 704, through the rules engine, may evaluate 714 the one or more rules corresponding to the "StartSession" command from the controlling device 702. The one or more rules may specify a proprietary protocol or other communications protocol utilized by the network-connected device to transmit and receive messages. Additionally, the one or more rules may specify the amount of memory and processing capacity allocated to the container instance 708, as well as configuration information for one or more applications that may be executed through the container instance 708.

The network-connected device service 704 may utilize the one or more rules to generate a request to invoke a container instance 708 that can be used to establish a communications session with the network-connected device. For instance, the network-connected device service 704 may generate an "InvokeContainer" 716 API call or MQTT message that is sent to the container service 706 for processing. The request may specify one or more parameters for the configuration of the container instance 708. Further, the request may specify information regarding the network-connected device, such as the communications protocol utilized by the network-connected device and one or more addresses for the network-connected device (e.g., network addresses, telephone numbers, unique identifiers, etc.). The container service 706 may evaluate the request to invoke the container instance 708 and identify the resources necessary to provision the requested container instance 708. Thus, in response to the request, the container service 706 may launch 718 the container instance 708.

The container instance 708, through an agent operating within the container instance 708, may query 720 a network-connected device database maintained by the network-connected device service 704 to obtain information regarding the network-connected device. For instance, the information stored in the network-connected device database may include state information for the network-connected device, the addresses of the network-connected device (e.g., network addresses, telephone numbers, unique identifiers, etc.), the address of a network gateway connected to the network-connected device, credentials necessary to access the network in which the network-connected device resides, and the like. In response to the query, the network-connected device service 704 may provide 722 the network-connected device information to the container instance 708. The container instance 708 may utilize this information to connect 724 to the network-connected device. For instance, the container instance 708 may establish a communications session with the network-connected device using the communications protocol of the network-connected device.

Figure 8:
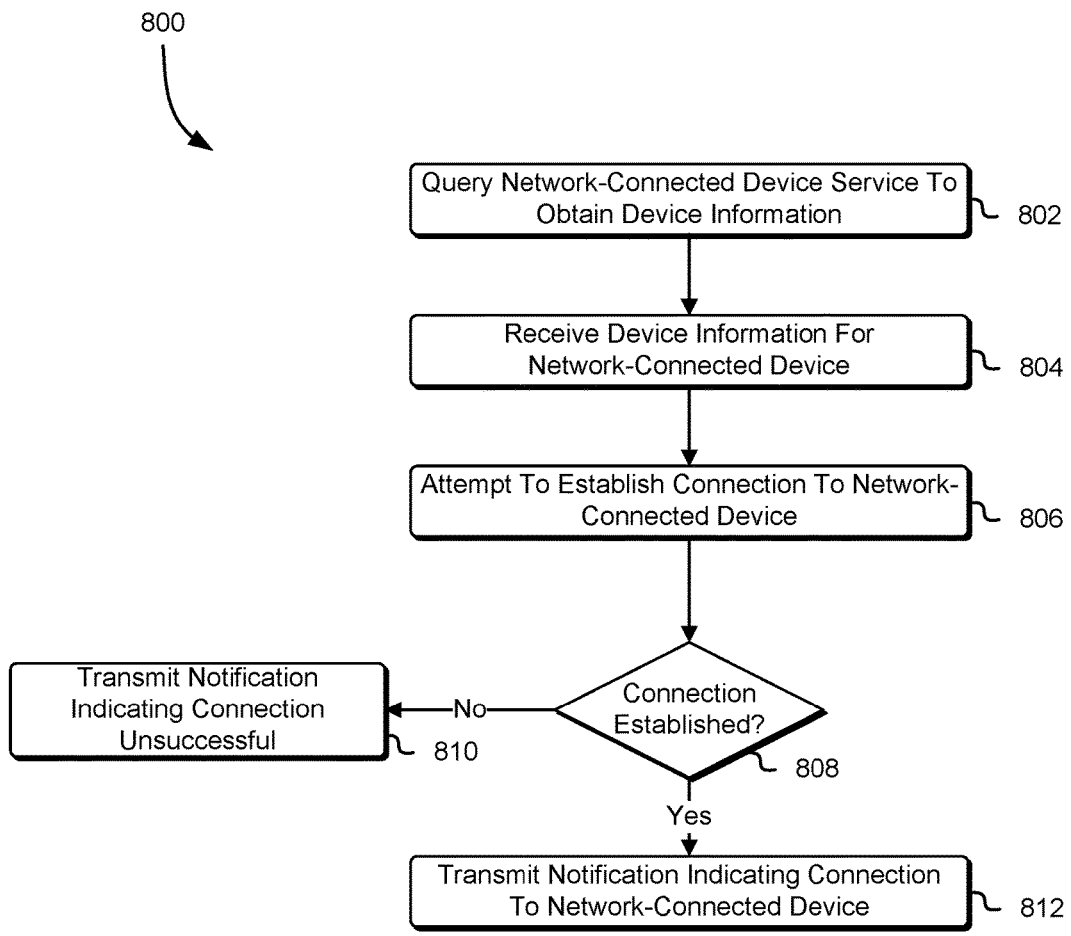
FIG. 8 shows an illustrative example of a process for establishing a communications session with a network-connected device in accordance with at least one embodiment.

As noted above, the container service may launch a container instance that can be used to establish a communications session with a particular network-connected device. This container instance may obtain information regarding the network-connected device that may be used to locate the network-connected device and, through use of the communications protocol utilized by the network-connected device, establish the communications session. Accordingly, FIG. 8 shows an illustrative example of a process 800 for establishing a communications session with a network-connected device in accordance with at least one embodiment. The process 800 may be performed by a container instance launched by the container service.

The container instance may be launched by the container service using the amount of memory and processing capacity specified in the rules provided by the user of the controlling device, as described above. Further, the container instance may be launched with one or more applications that may be used to establish the communications session with the network-connected device and to communicate with the network-connected device service. Thus, the container instance may utilize an application or process to query 802 the network-connected device service. The query to the network-connected device service may include a unique identifier for the network-connected device or for the session that is to be established. This may enable the network-connected device service to identify the database for the network-connected device.

In response to the query from the container instance, the network-connected device service may identify the database for the network-connected device and obtain the information from the database required by the container instance. The information may specify the location of the network-connected device, the communications protocols used by the network-connected device, the contact information for the network-connected device, state information for the network-connected device, and the like. The network-connected device service may transmit this information to the container instance to fulfill the query. Thus, the container instance may receive 804 the device information for the network-connected device.

The container instance may use the information provided by the network-connected device service to attempt 806 to establish a connection to the network-connected device. For instance, the container instance may identify, from the information provided, the communications protocol used by the network-connected device to transmit and receive messages. The container instance may transmit a request using this particular communications protocol to the network-connected device or a network gateway within the network of the network-connected device to establish a communications session with the network-connected device.

Based at least in part on the communications with the network-connected device, the container instance may determine 808 whether a connection with the network-connected device has been successfully established. If the container instance is unable to establish a successful communications session with the network-connected device, the container instance may transmit 810 a notification to the network-connected device service to indicate that the attempt to establish a communications session with the network-connected device was unsuccessful. This may cause the network-connected device service to notify the user of the controlling device that the connection to the network-connected device could not be established. However, if the container instance is able to establish a communications session with the network-connected device, the container instance may transmit 812 a notification to the network-connected device service to indicate that the connection with the network-connected device has been successfully established.

Figure 9:
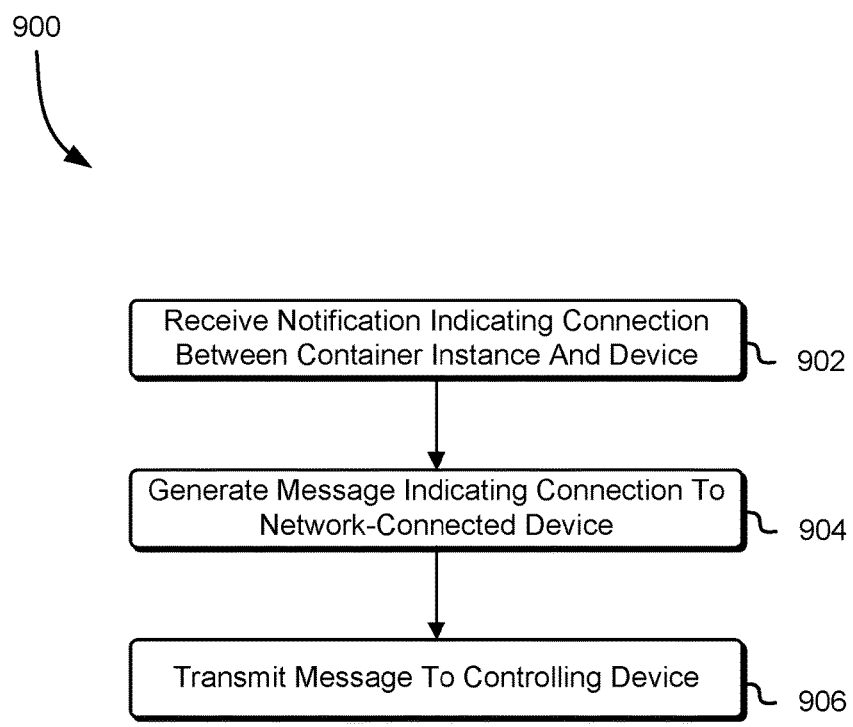
FIG. 9 shows an illustrative example of a process for notifying a controlling device that a communications session has been established between a container instance and a network-controlled device in accordance with at least one embodiment.

FIG. 9 shows an illustrative example of a process 900 for notifying a controlling device that a communications session has been established between a container instance and a network-controlled device in accordance with at least one embodiment. The process 900 may be performed by the network-connected device service, which may receive one or more notifications and messages from a container instance that has established a communications session with a particular network-connected device. The process 900 may also be performed in response to the successful establishment of a communications session between the container instance and the network-connected device, as described above in connection with FIG. 8.

As noted above, the network-connected device service may transmit a request to a container service to invoke a container instance that can be used to establish a communications session with a particular network-connected device. The container instance may query the network-connected device service to obtain information regarding the network-connected device that may be used to establish a communications session with the device. If the communications session with the network-connected device is established, the container instance may transmit a notification to the network-connected device service indicating that the communications session has been established and is available for use. Thus, the network-connected device service may receive 902 a notification from the container instance indicating that the connection between the container instance and the network-connected device has been established.

In response to the notification from the container instance, the network-connected device service may generate 904 a message indicating that the connection to the network-connected device has been established. The message may specify state information for the network-connected device, as well as information regarding the container instance, which a user may utilize to directly access the container instance to interact with the network-connected device through the communications session. The network-connected device service may transmit 906 the message to the controlling device that submitted the original request to establish the communications session with the network-connected device. In some embodiments, the network-connected device service publishes the message to a message topic designated for the network-connected device. The controlling device, which may be subscribed to the message topic, may access the message topic provided by the network-connected device service to obtain the message and obtain an indication that the communications session has been successfully established. Thus, through use of the message topic, the network-connected device service may enable the controlling device to submit one or more commands that can be executed by the network-connected device. For instance, the controlling device may add the one or more commands to the message topic, which the container instance may access to obtain the commands and transmit the commands to the network-connected device for execution.

Figure 10:
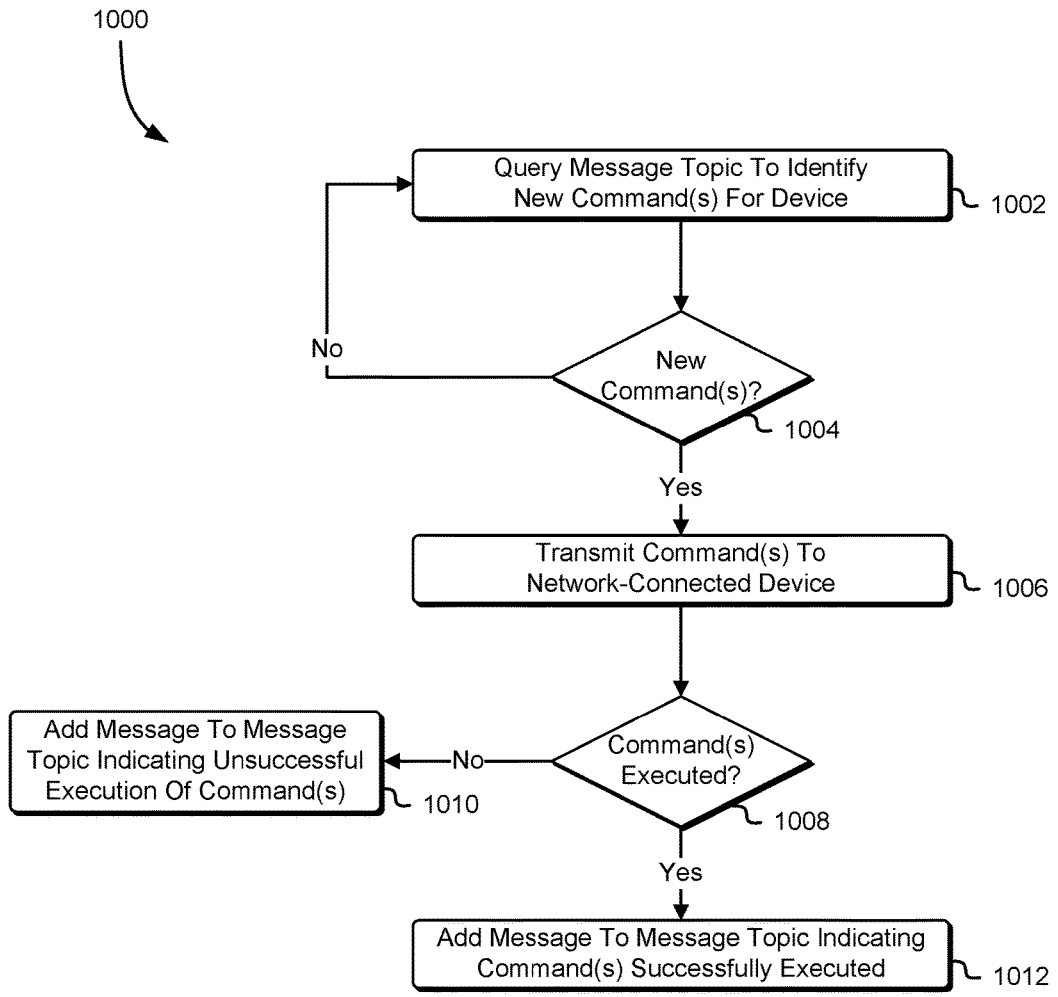
FIG. 10 shows an illustrative example of a process for transmitting one or more commands to a network-connected device through a previously established communications session in accordance with at least one embodiment.

As noted above, a network-connected device service may establish a message topic that is specific to a communications session with a particular network-connected device. For instance, the message topic may be assigned a unique identifier that may be used to distinguish the message topic from other message topics. The controlling device may be subscribed to the message topic to obtain messages regarding the execution of commands by the network-connected device. Further, a container instance that has established a communications session with the network-connected device may also be subscribed to the message topic to obtain any commands published to the message topic by the controlling device. If the message topic specifies one or more commands to be executed by the network-connected device, the container instance may obtain and transmit these commands to the network-connected device for execution. Accordingly, FIG. 10 shows an illustrative example of a process 1000 for transmitting one or more commands to a network-connected device through a previously established communications session in accordance with at least one embodiment. The process 1000 may be performed by the aforementioned container instance.

At any time while an active communications session is being utilized to communicate with the network-connected device, the container instance may query 1002 a message topic designated to the communication session between the container instance and the network-connected service to identify any new commands that are to be executed by the network-connected device. For instance, a user of the controlling device may access the network-connected device service to add one or more commands that are to be executed by the network-connected device to the message topic. The container instance may receive, in response to the query, any messages and/or commands that were added to the message topic since a previous query submitted by the container instance. Thus, the container instance may determine 1004 whether any new commands have been added to the message topic.

If the message topic does not include any new commands that are to be executed by the network-connected device, the container instance may continue to query 1002 the message topic periodically or aperiodically (e.g., in response to a triggering event) for new commands that may be executed by the network-connected device. However, if the message topic includes one or more new commands that are to be executed by the network-connected device, the container instance may transmit 1006 these one or more new commands to the network-connected device for execution. The container instance may monitor the communications session with the network-connected device to observe execution of the provided commands.

In some embodiments, the network-connected device transmits one or more notifications to the container instance over the communications session to indicate the status of execution of the one or more commands. Based at least in part on these notifications from the network-connected device, the container instance may determine 1008 whether any of the provided set of commands have been executed successfully. If the network-connected device was unable to execute the provided commands successfully, the container instance may access the network-connected device service to add 1010 a new message to the message topic for the communications session to indicate that the commands were not executed successfully. Alternatively, if the network-connected device was able to execute the provided commands successfully, the container instance may add 1012 a new message to the message topic for the communications session to indicate that the commands were executed successfully. A user of a controlling device may access this message topic to obtain the new message and determine what actions to perform based at least in part on whether the commands were executed successfully or not.

Figure 11:
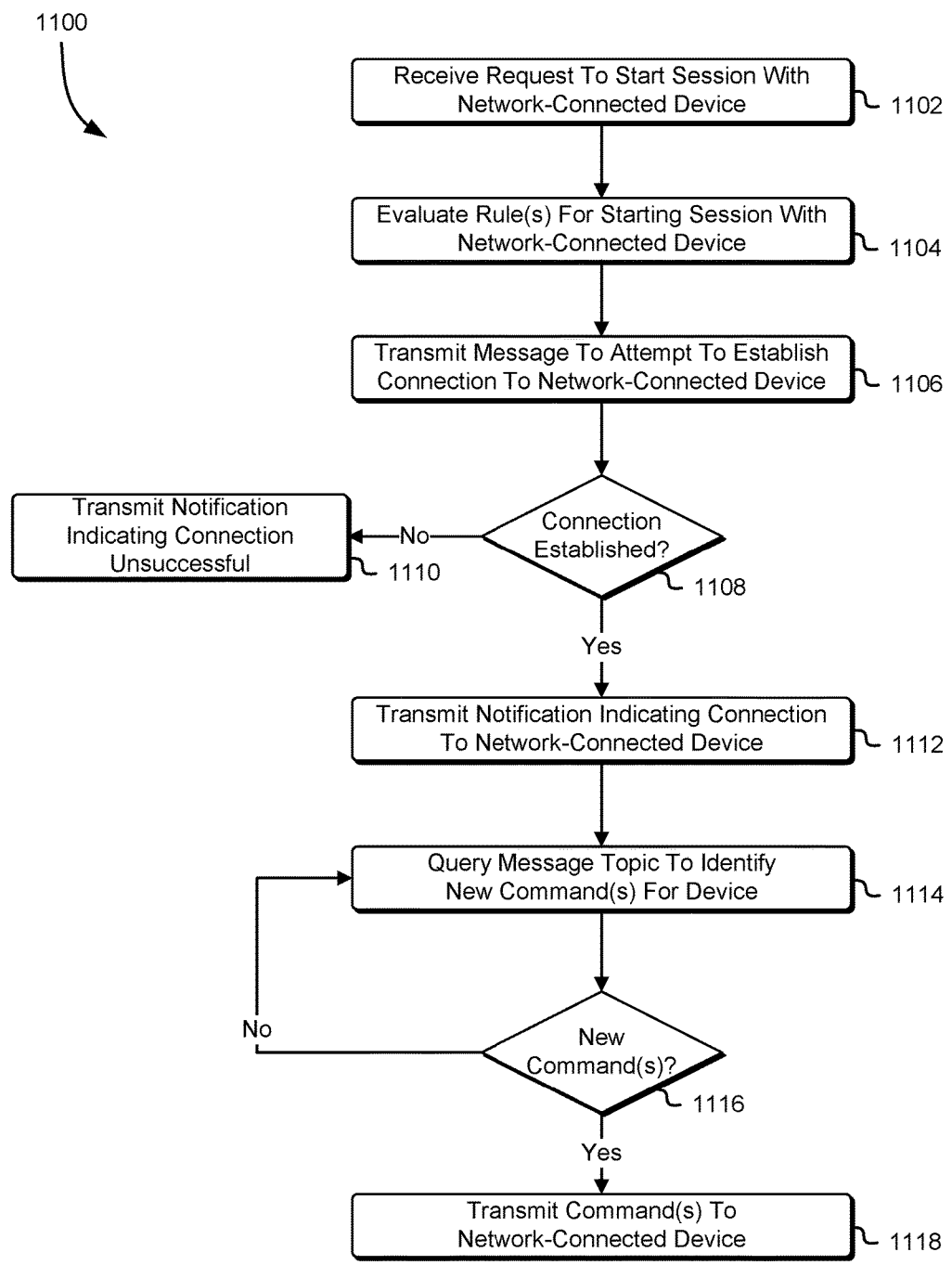
FIG. 11 shows an illustrative example of a process for establishing a connection to a network-connected device to enable transmissions of commands through text-based messaging systems in accordance with at least one embodiment.

As noted above, the network-connected device service may establish a communications channel with a network-connected device that is connected to a mobile communications network. For instance, in response to a request from a controlling device to establish the communications channel with the network-connected device, the network-connected device service may transmit one or more SMS messages or other electronic messages to the network-connected device through an access point of the mobile communications network to establish the communications channel. The network-connected device may acknowledge receipt of the one or more SMS or electronic messages, which may further enable the device to access a message topic for the device to obtain commands from the controlling device for execution. Accordingly, FIG. 11 shows an illustrative example of a process 1100 for establishing a connection to a network-connected device to enable transmissions of commands through text-based messaging systems in accordance with at least one embodiment. The process 1100 may be performed by the aforementioned network-connected device service, which may process incoming requests from controlling devices to establish a communications channel with a network-connected device over a mobile communications network, such as a cellular network or any other network based at least in part on Time Division Multiple Access (TDMA) systems, Global System for Mobile Communications (GSM), Universal Mobile Telecommunications System (UMTS), their derivatives, and the like.

At any time, a user of a controlling device may submit a request to the network-connected device service to initiate a communications session with a particular network-connected device, as specified by the user. For instance, the controlling device may submit a request to start a communications session with the network-connected device, such as through use of a "StartSession" API call or MQTT message. Thus, the network-connected device service may receive 1102 the request from the controlling device to start a communications session with the network-connected device. In response to the request, the network-connected device service may evaluate 1104 one or more rules associated with the network-connected device that may be used for starting the session with the network-connected device. For instance, through the rules engine, the network-connected device service may evaluate the one or more rules corresponding to the "StartSession" command from the controlling device. The one or more rules may specify one or more identifiers for the network-connected device, such as a telephonic number or other network address that may be used to locate the device. Further, the one or more rules may specify a particular access point to which the network-connected device may be connected within the mobile communications network.

Based at least in part on the information specified in the one or more rules, the network-connected device service may transmit 1106 one or more messages to the network-connected device to attempt to establish a connection to the network-connected device. For instance, the network-connected device service may transmit one or more SMS or other electronic messages to the network-connected device. These SMS or other electronic messages may specify a network address or other information that may be used by the network-connected device to interact with the network-connected device service. Through an access point of the mobile communications network, the network-connected device may receive the one or more SMS or other electronic messages from the network-connected device service. If the network-connected device is able to successfully acknowledge receipt of the messages and to establish a connection to the network-connected device service, the network-connected device may transmit its own SMS or other electronic messages to the network-connected device service to indicate that the connection has been successfully established. Thus, the network-connected device service may determine 1108 whether the connection with the network-connected device has been established.

If the network-connected device service does not receive an indication from the network-connected device that the connection has been established or receives an indication that the connection could not be established (e.g., connections are prohibited, etc.), the network-connected device service may transmit 1110 a notification indicating that the connection with the network-connected device was unsuccessful. For instance, the network-connected device service may add a message to the message topic designated for the network-connected device that indicates that the connection could not be established. The controlling device, which may be subscribed to this message topic, may obtain the message from the message topic. Alternatively, if the network-connected device service receives an indication from the network-connected device specifying that the connection has been successfully established, the network-connected device service may transmit 1112 a notification to the controlling device to indicate that the connection has been established. The network-connected device service may provide this notification through the aforementioned message topic designated for the network-connected device.

The controlling device may, if the connection with the network-connected device has been established, publish one or more commands to a message topic for the network-connected device that may be executed by the network-connected device. The network-connected device service may query 1114 the message topic to determine whether the controlling device has added one or more messages, including the one or more commands, to the message topic. For instance, the network-connected device service may periodically query the message topic to determine whether any new messages have been added to the message topic. Alternatively, the network-connected device service may detect if a message has been added to the message topic and query the message topic in response to detection of the message.

The network-connected device service may evaluate the results of the query to determine 1116 whether any new commands have been added to the message topic for the network-connected device. If the network-connected device service determines that no new commands have been added to the message topic, the network-connected device service may continue to query 1114 the message topic periodically or in response to detection of a new message added to the message topic to identify any new commands that may be destined for the network-connected device. However, if the network-connected device service determines that one or more new commands have been added to the message topic, the network-connected device service may transmit 1118 these one or more new commands to the network-connected device. For instance, the network-connected device service may transmit one or more SMS or other electronic messages to the network-connected device through the device's access point. The one or more SMS or other electronic messages may include the one or more new commands provided by the controlling device. Alternatively, the one or more SMS or electronic messages may specify that one or more new commands are available within the message topic. This may cause the network-connected device to access the message topic to obtain the one or more new commands for execution.

Figure 12:
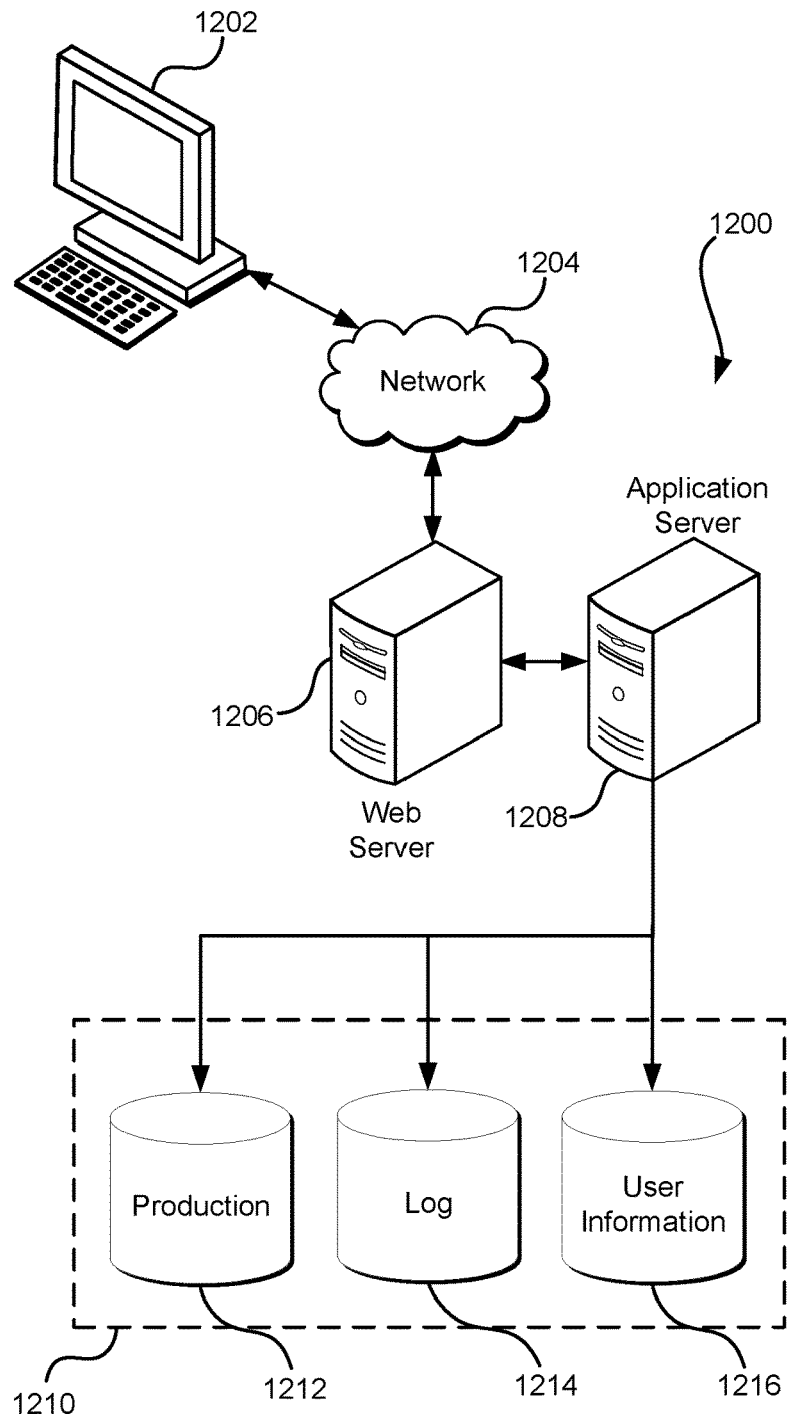
FIG. 12 shows an illustrative example of an environment in which various embodiments can be implement.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request, from a controlling device that can interact with a network-connected device, to establish a communications session with the network-connected device, the request specifying a device identifier usable to identify one or more rules for processing the request;
   obtaining, based at least in part on the device identifier, the one or more rules whereby the one or more rules specify at least a location of the network-connected device and a communications protocol utilized by the network-connected device;
   invoking, based at least in part on the one or more rules corresponding to the device identifier, a software container instance, the software container instance being a computer system instance capable of establishing the communications session with the network-connected device;
   providing, to the software container instance, communications protocol information of the network-connected device;
   receiving, from the software container instance, an acknowledgement that the communications session has been established using the communications protocol specified in the communications protocol information;
   transmitting a notification to the controlling device that indicates the acknowledgement; and
   enabling communications between the controlling device and the network-connected device over the communications session.

2. The computer-implemented method of claim 1, wherein the method further comprises:
   receiving, from the controlling device, one or more commands to be executed by the network-connected device;
   providing, to the software container instance, the one or more commands to cause the software container instance to transmit the one or more commands to the network-connected device over the communications session;
   receiving, from the software container instance, one or more messages indicating whether the one or more commands were executed by the network-connected device; and
   transmitting the one or more messages to the controlling device.

3. The computer-implemented method of claim 2, wherein:
   the one or more commands to be executed by the network-connected device are added to a message topic designated for the communications session; and
   providing the one or more commands to the software container instance includes transmitting a second notification to the software container instance to indicate that the one or more commands were added to the message topic to cause the software container instance to obtain the one or more commands from the message topic.

4. The computer-implemented method of claim 1, wherein the communications protocol is a protocol utilized by the network-connected device to transmit messages and to receive messages within a network.

5. A system, comprising:
   one or more processors; and
   memory including instructions that, when executed by the one or more processors, cause the system to:
   receive a request to establish a communications session with a network-connected device;
   identify one or more rules for establishing the communications session;
   invoke, based at least in part on the one or more rules, a software container instance, the software container instance being a computer system instance;
   provide the software container instance with information from the one or more rules to enable the software container instance to establish the communications session with the network-connected device;
   determine whether the communications session has been established between the software container instance and the network-connected device; and
   if it is determined that the communications session has been established, provide a notification indicating that the communications session has been established.

6. The system of claim 5, wherein the instructions further cause the system to:
   receive, from a controlling device, one or more commands to be executed by the network-connected device; and
   add the one or more commands to a message topic designated for the communications session to cause the software container instance to:
   obtain the one or more commands from the message topic; and
   transmit the one or more commands to the network-connected device over the communications session.

7. The system of claim 6, wherein the instructions further cause the system to: receive one or more messages from the software container instance specifying whether the one or more commands were executed by the network-connected device; and add the one or more messages from the software container instance to the message topic to enable the controlling device to obtain the one or more messages.

8. The system of claim 5, wherein the one or more rules specify at least a location of a registry that specifies a location of the network-connected device and a communications protocol utilized by the network-connected device.

9. The system of claim 8, wherein the communications session is established to enable communications between the software container instance and the network-connected device using the communications protocol utilized by the network-connected device.

10. The system of claim 5, wherein: the network-connected device is operating within a private communications network; and the software container instance is invoked in a virtual private network associated with the private communications network to enable the software container instance to access the network-connected device through a network gateway of the private communications network.

11. The system of claim 5, wherein:
the request to establish the communications session with the network-connected device specifies an identifier of the network-connected device; and
the instructions further cause the system to utilize the identifier of the network-connected device to identify the one or more rules.

12. The system of claim 5, wherein the instructions further cause the system to, if it is determined that the communications session could not be established between the software container instance and the network-connected device, provide an indication that the communications session has not been established.

13. A non-transitory computer-readable storage medium having stored thereon executable instructions that, as a result of being executed by one or more processors of a computer system, cause the computer system to at least:
receive a first request to establish a communications session with a network-connected device;
transmit a second request to a container service to invoke a software container instance, the software container instance being a computer system instance capable of establishing a communications session with a network-connected device, the second request specifying network information for the network-connected device,
receive a notification from the software container instance indicating whether the communications session with the network-connected device has been established;
if the communications session has been established, provide an indication to a controlling device that the communications session, usable by the controlling device to submit commands to the network-connected device, has been established; and
enable communications between the controlling device and the network-connected device over the communications session.

14. The non-transitory computer-readable storage medium of claim 13, wherein the executable instructions further cause the computer system to: receive, from the controlling device, one or more rules that specify at least the network information for the network-connected device; and obtain the network information for the network-connected device from the one or more rules to generate the second request to the container service to invoke the software container instance.

15. The non-transitory computer-readable storage medium of claim 13, wherein the executable instructions further cause the computer system to: receive, from the controlling device, a third request to establish the communications session with the network-connected device, the third request specifying an identifier of the network-connected device; and in response to the third request, utilize the identifier of the network-connected device to obtain the network information for the network-connected device for the second request to the container service to invoke the software container instance.

16. The non-transitory computer-readable storage medium of claim 13, wherein: the network information specifies that the network-connected device is located within a private communications network; and the software container instance is invoked within a virtual private network associated with the private communications network in response to the second request to enable the software container instance to communicate with the network-connected device through a network gateway of the private communications network.

17. The non-transitory computer-readable storage medium of claim 13, wherein the executable instructions further cause the computer system to provide a different indication to the controlling device that the communications session has not been established if the communications session could not be established by the software container instance.

18. The non-transitory computer-readable storage medium of claim 13, wherein the executable instructions further cause the computer system to: receive one or more commands from the controlling device; and provide the one or more commands to the software container instance to cause the software container instance to transmit, over the communications session with the network-connected device, the one or more commands to the network-connected device for execution.

19. The non-transitory computer-readable storage medium of claim 13, wherein the executable instructions that cause the computer system to provide the indication to the controlling device that the communications session has been established cause the computer system to: generate a message specifying information usable by the controlling device to access the software container instance; and add the message to a message topic designated for the communications session, the controlling device being subscribed to the message topic such that the controlling device can obtain the message from the message topic.

20. The non-transitory computer-readable storage medium of claim 13, wherein the communications session is established using a communications protocol of the network-connected device, the communications protocol specified in the network information.

* * * * *